Figure 7:
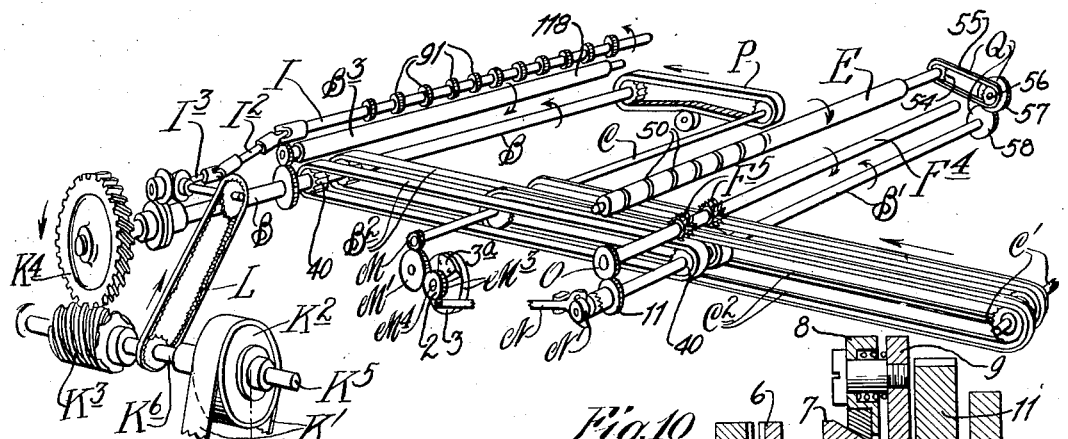

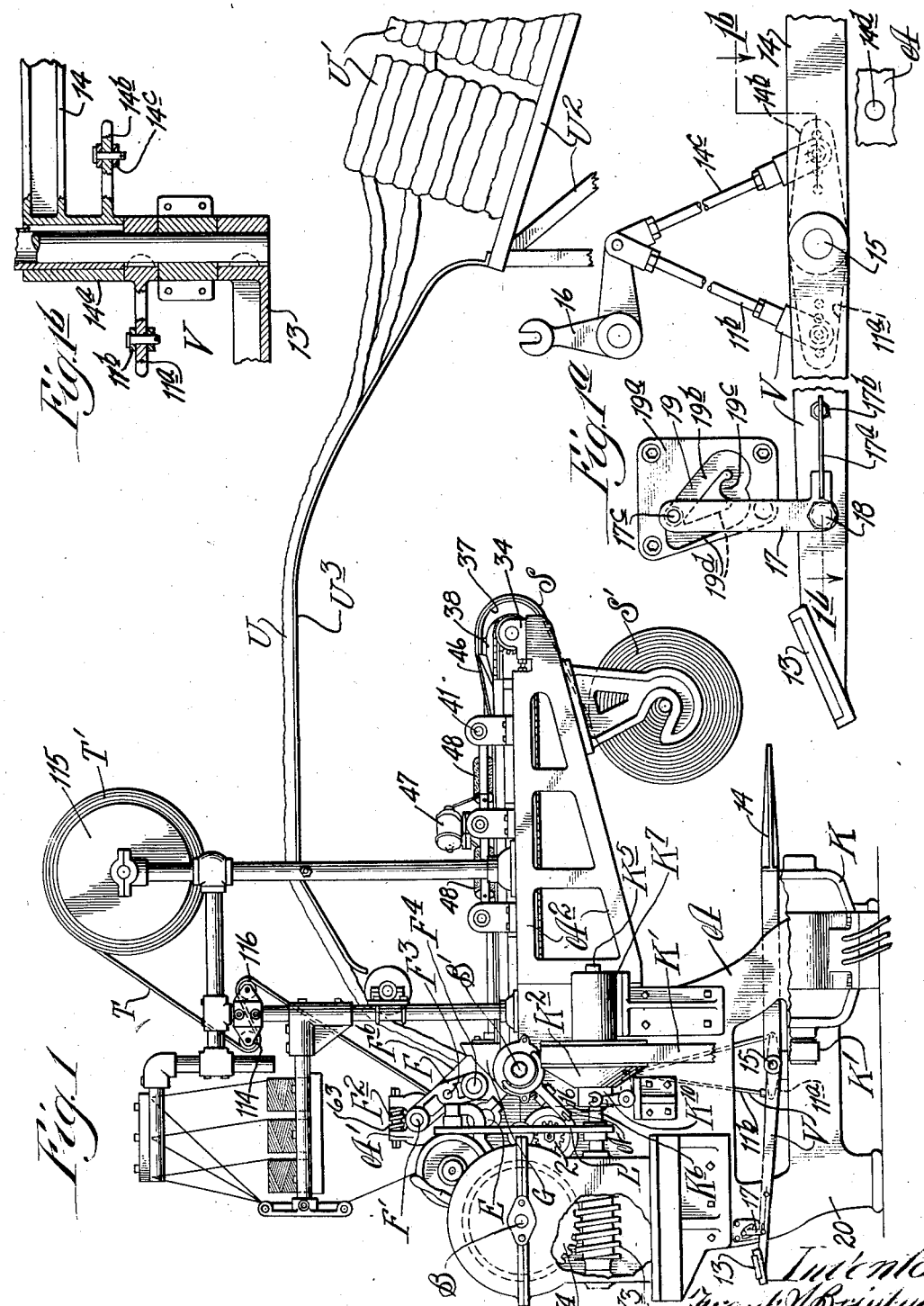

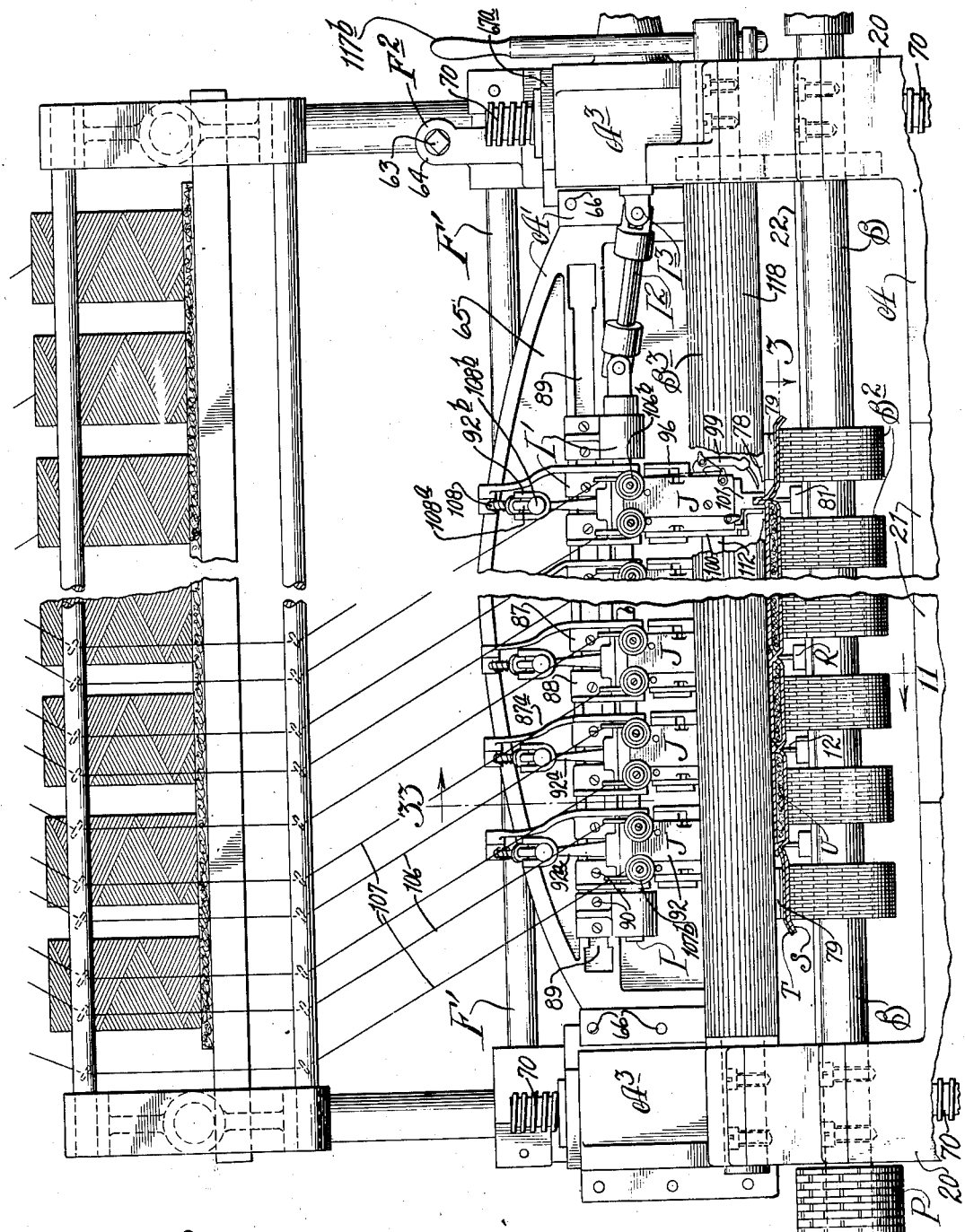

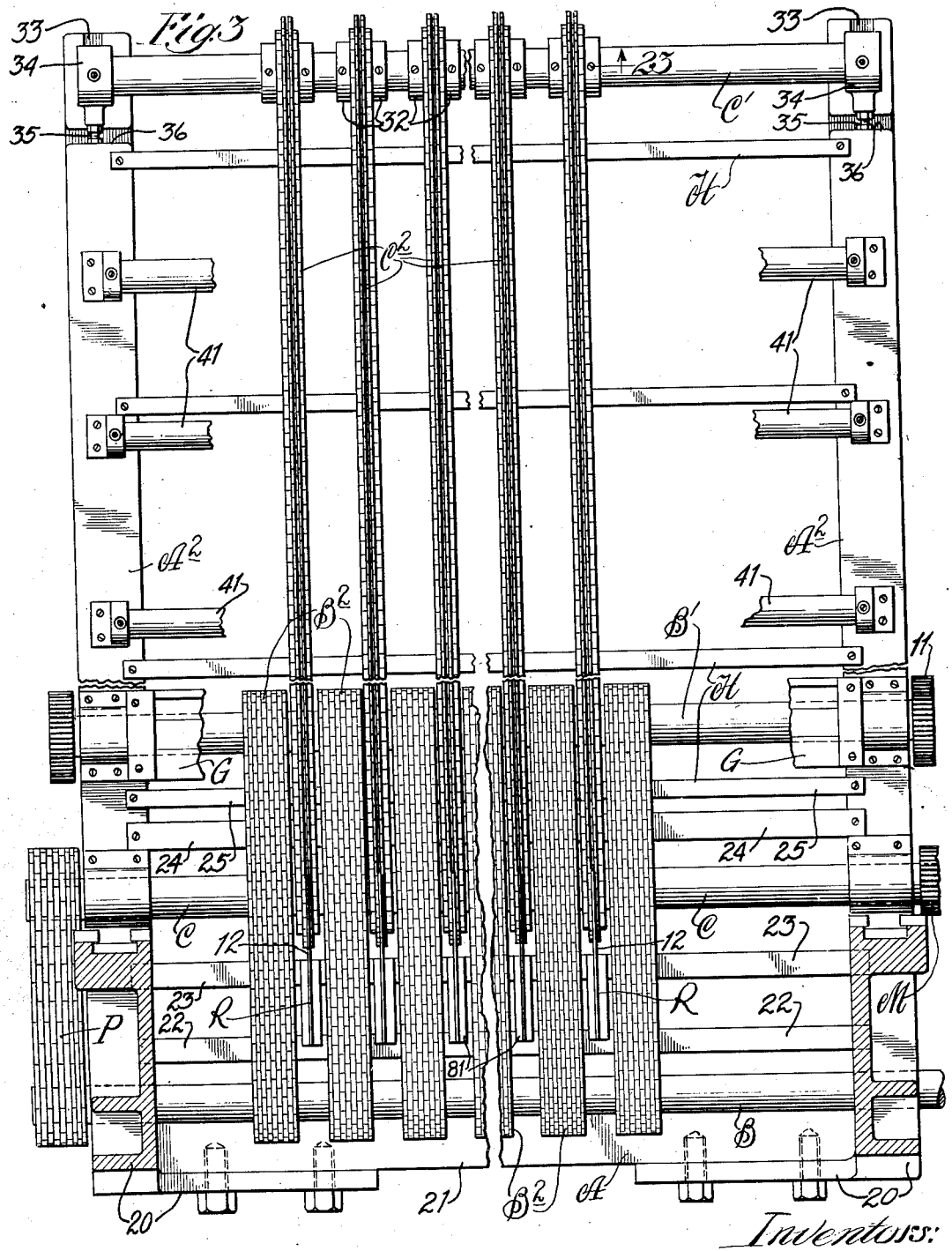

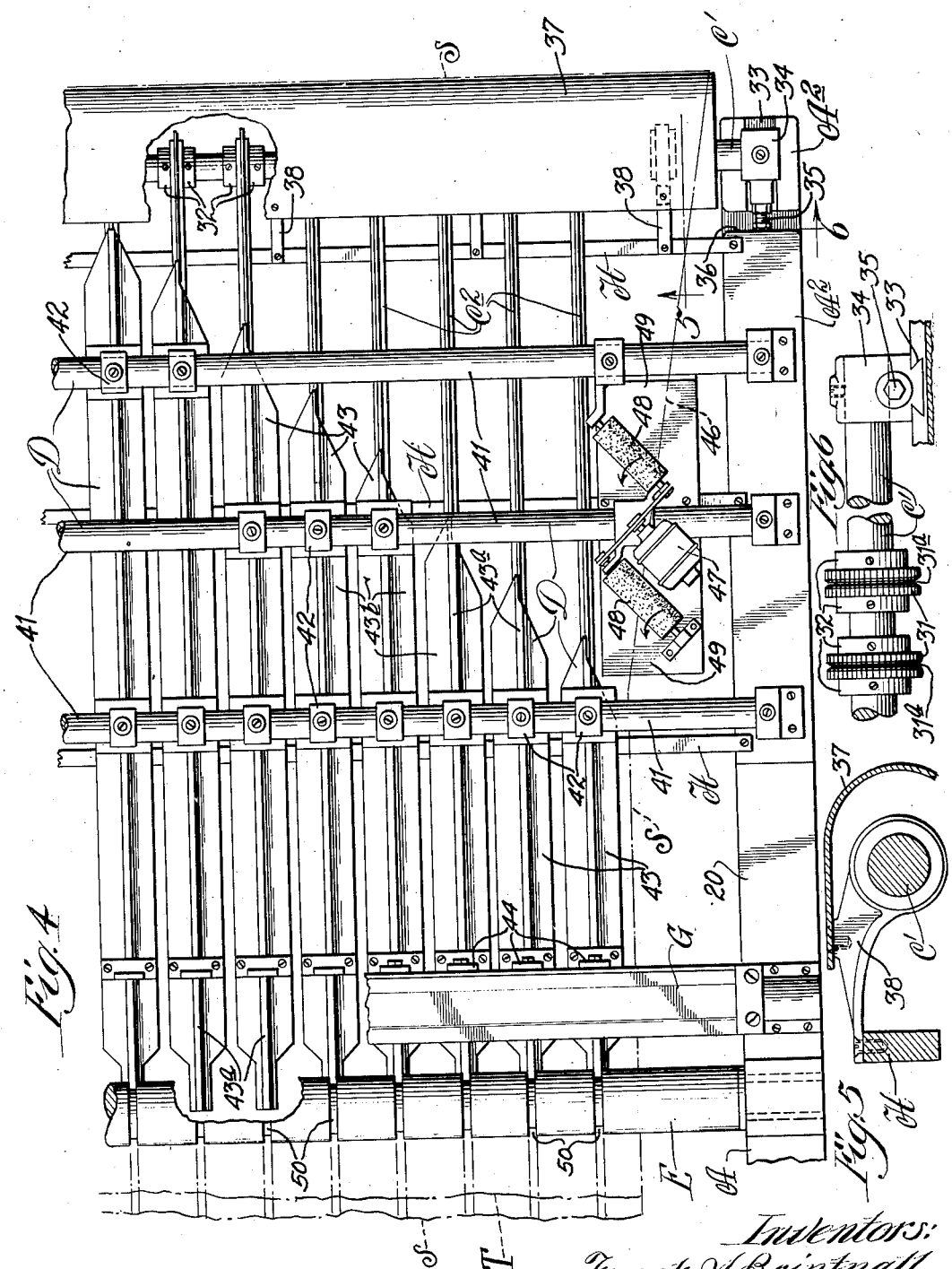

Sept. 29, 1931.  F. W. BRINTNALL ET AL  1,825,573
UPHOLSTERY MACHINE
Filed Oct. 5, 1928   15 Sheets-Sheet 5

Inventors:
Frank W. Brintnall
and Frederick N. Ross,
By Dempsey Lee, Clinton & Wiley
Attys.

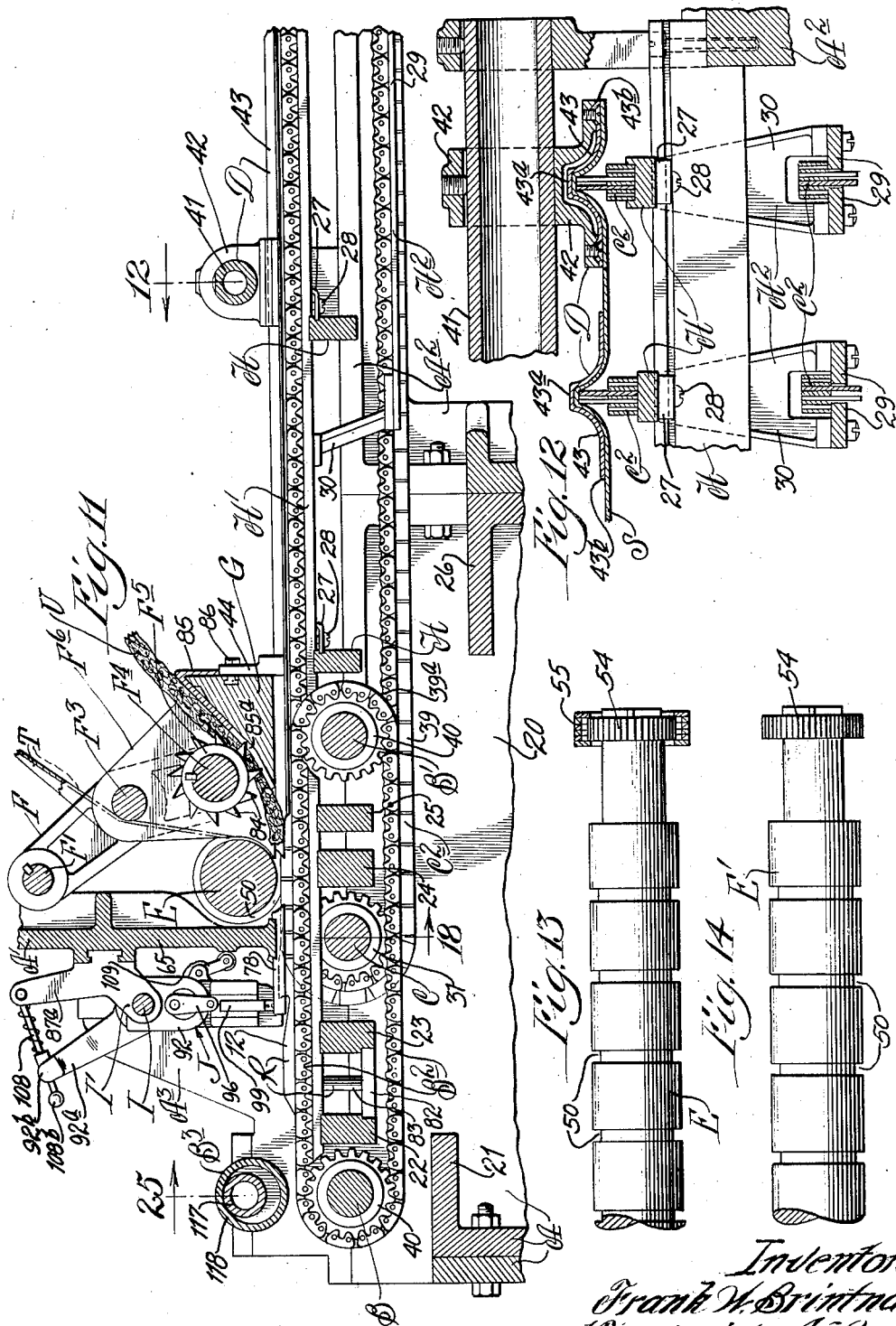

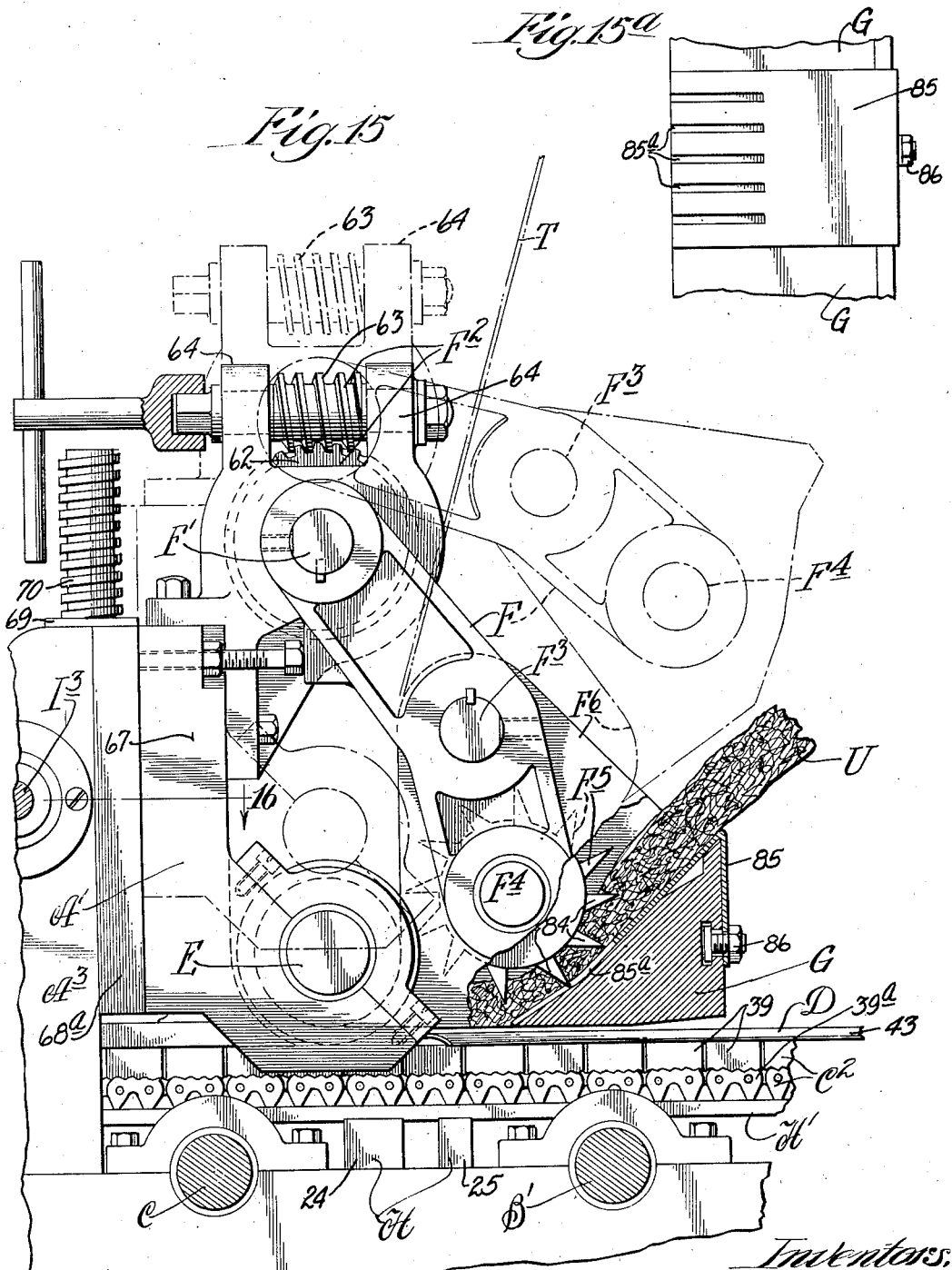

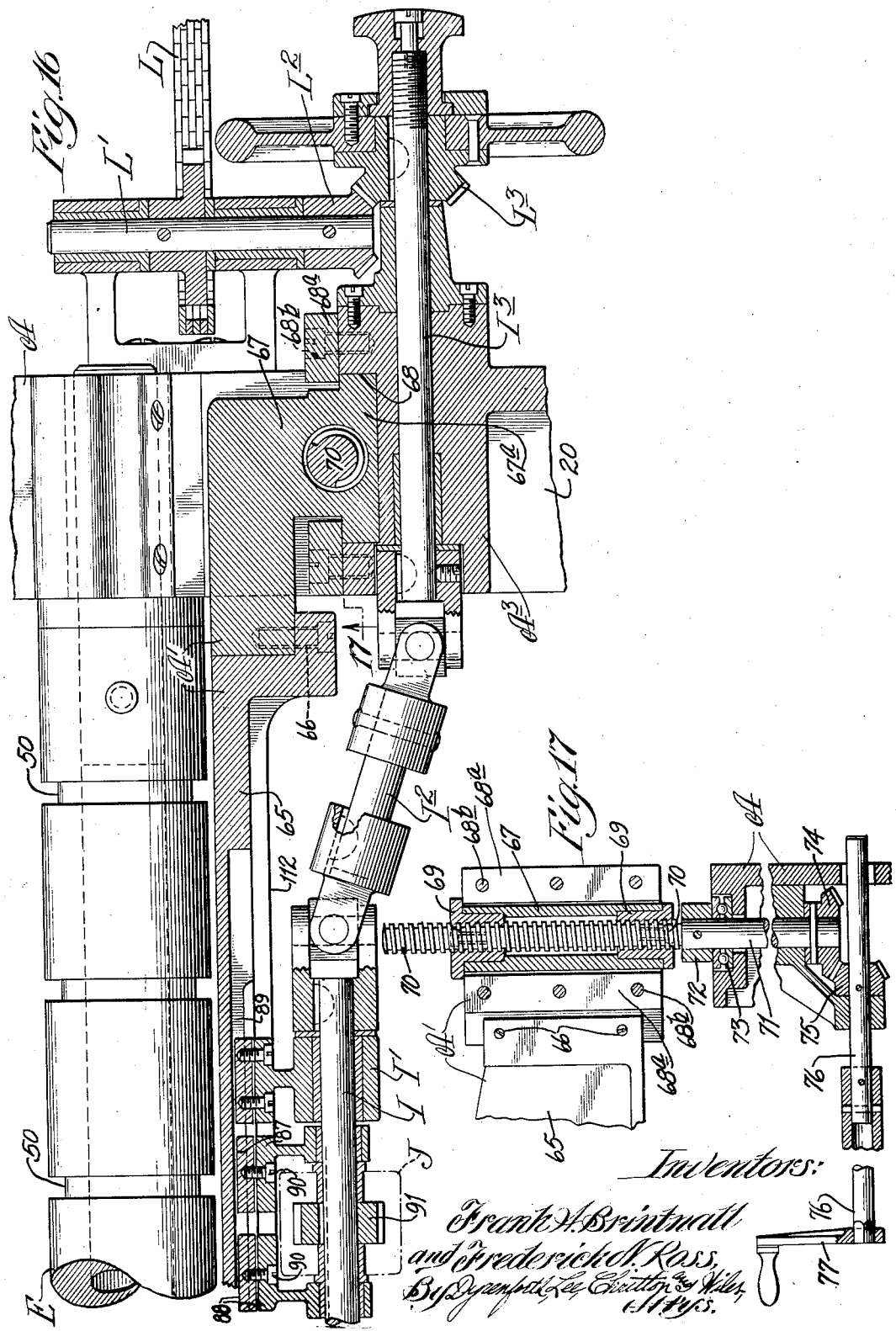

Sept. 29, 1931.  F. W. BRINTNALL ET AL  1,825,573
UPHOLSTERY MACHINE
Filed Oct. 5, 1928   15 Sheets-Sheet 9
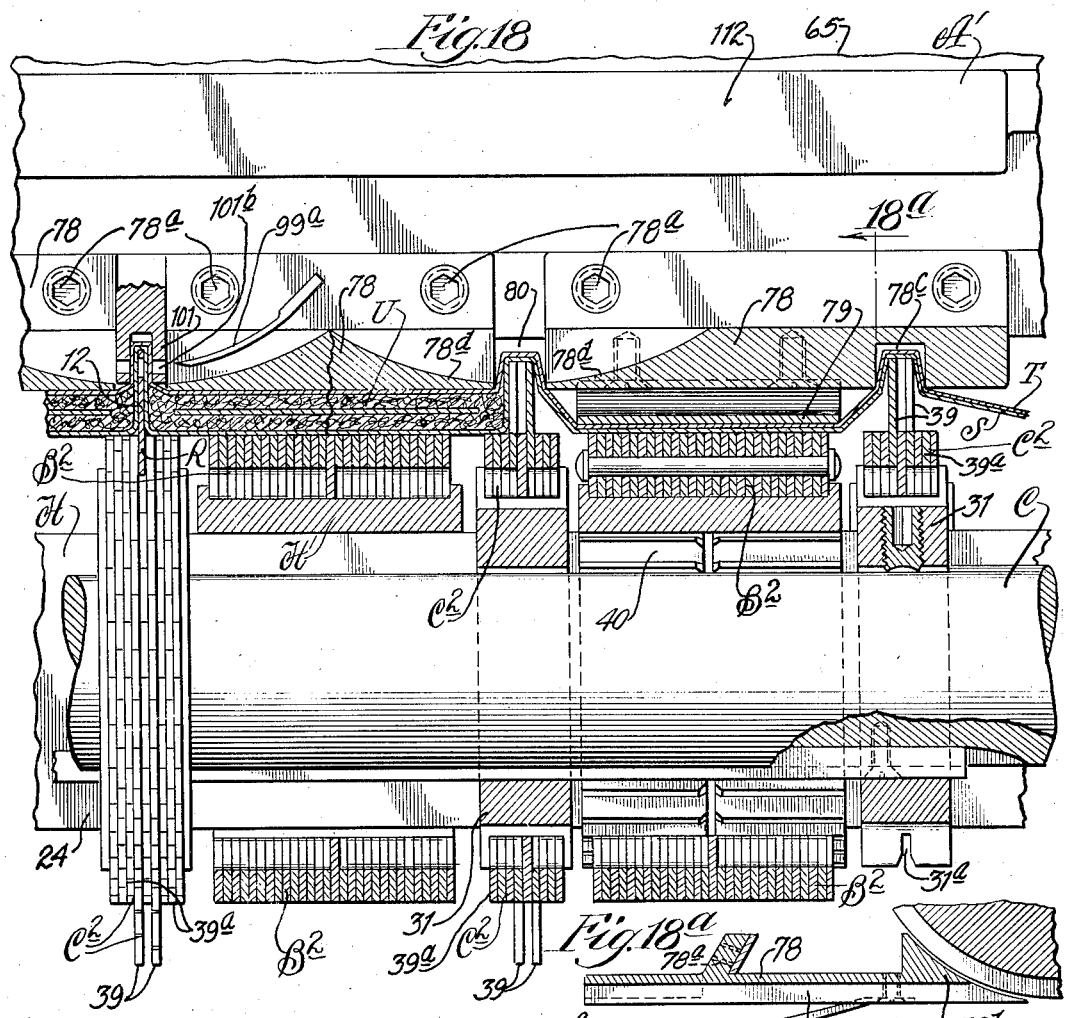
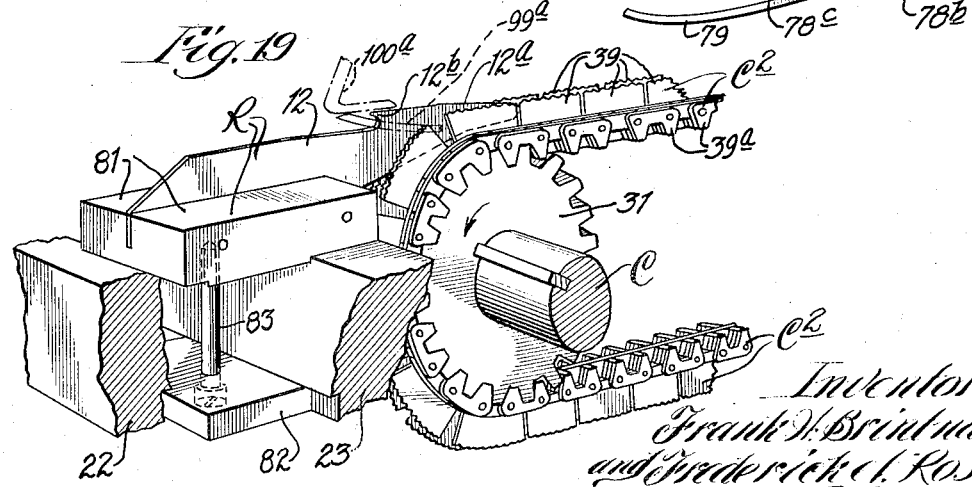

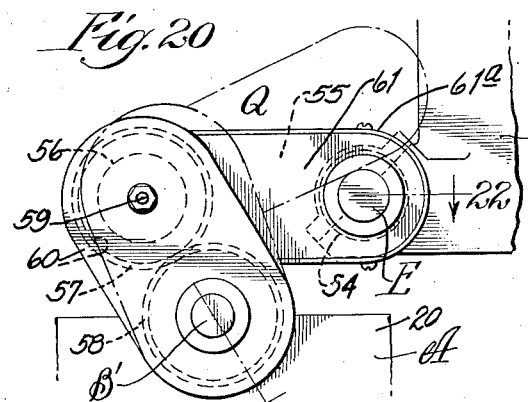
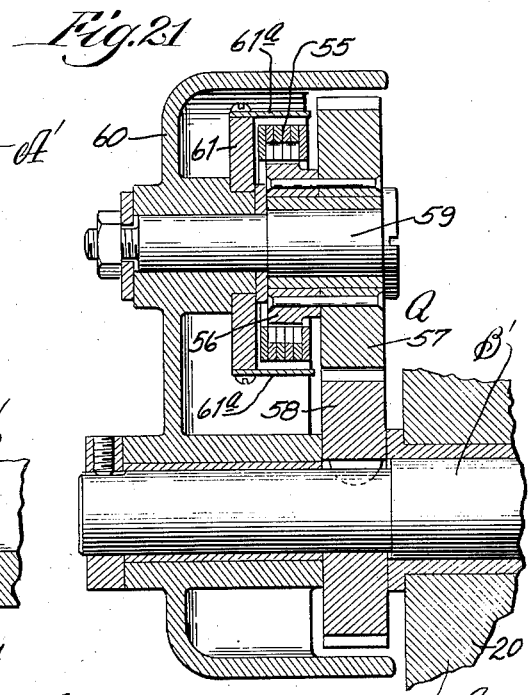
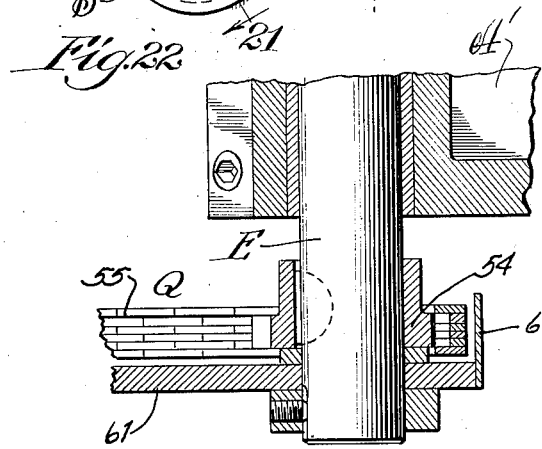
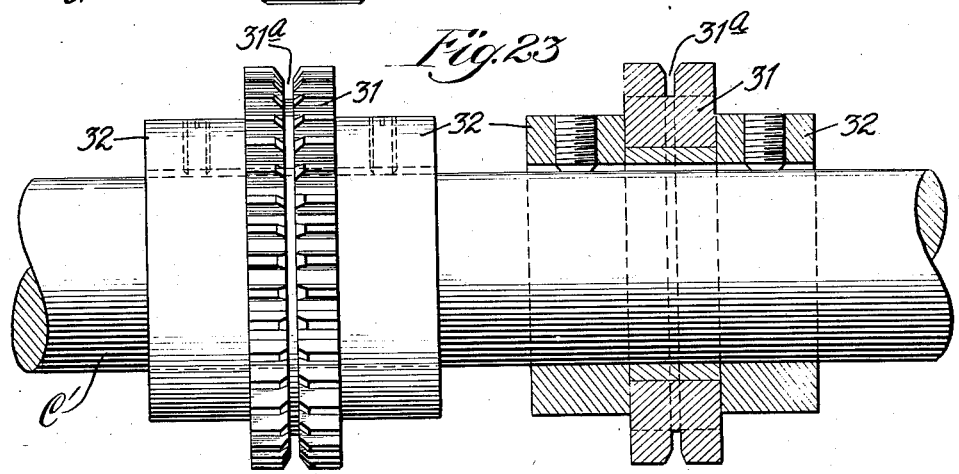

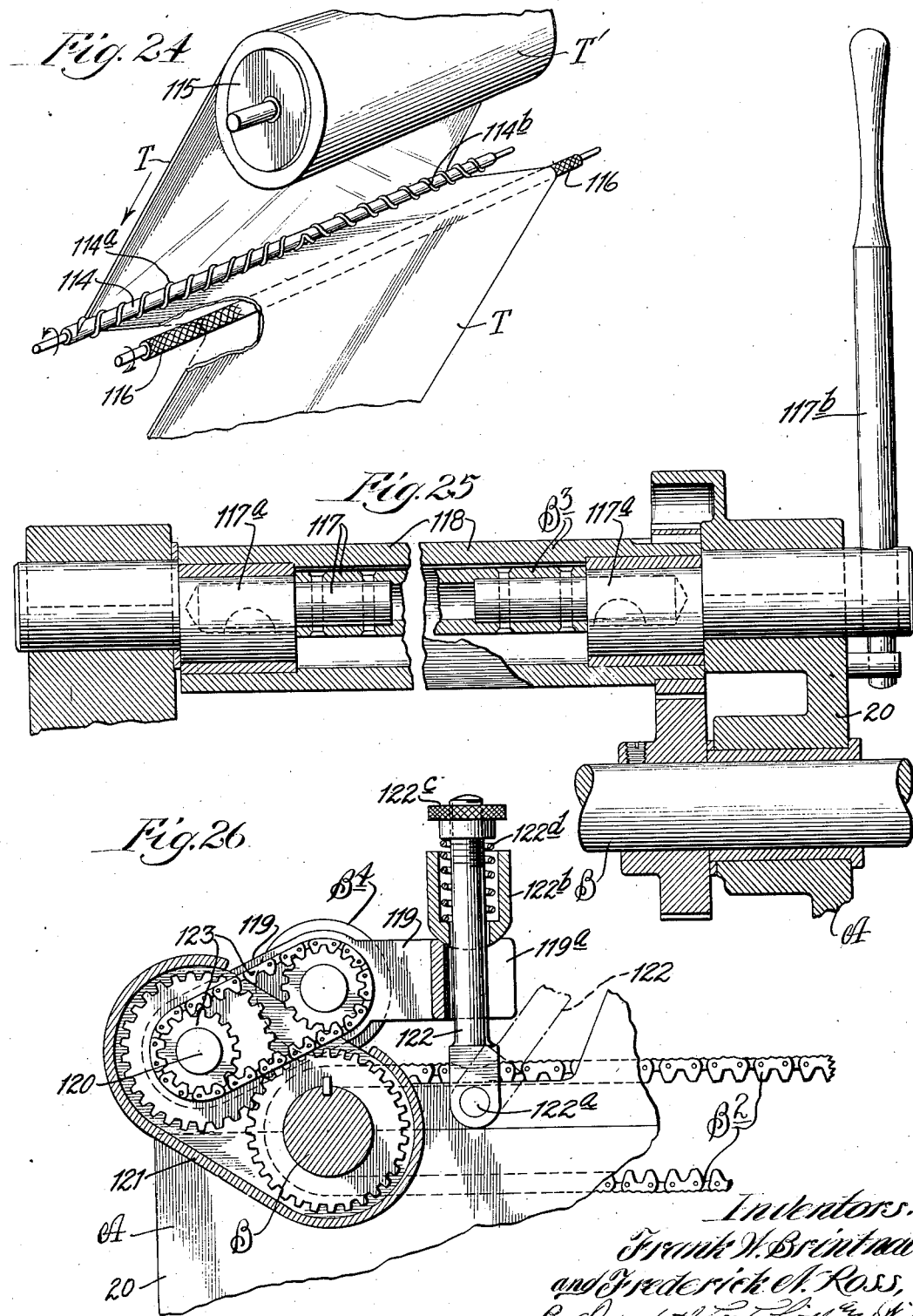

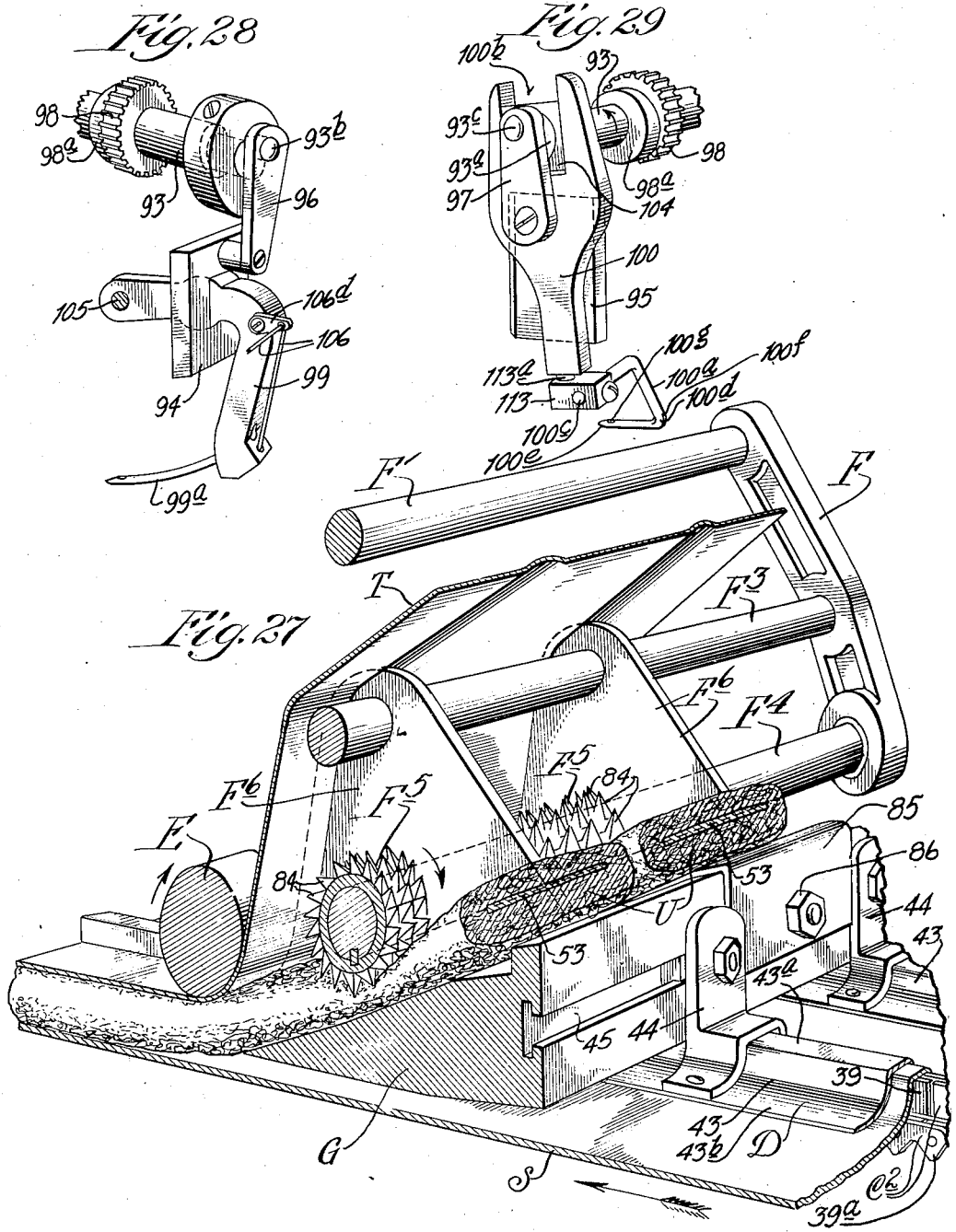

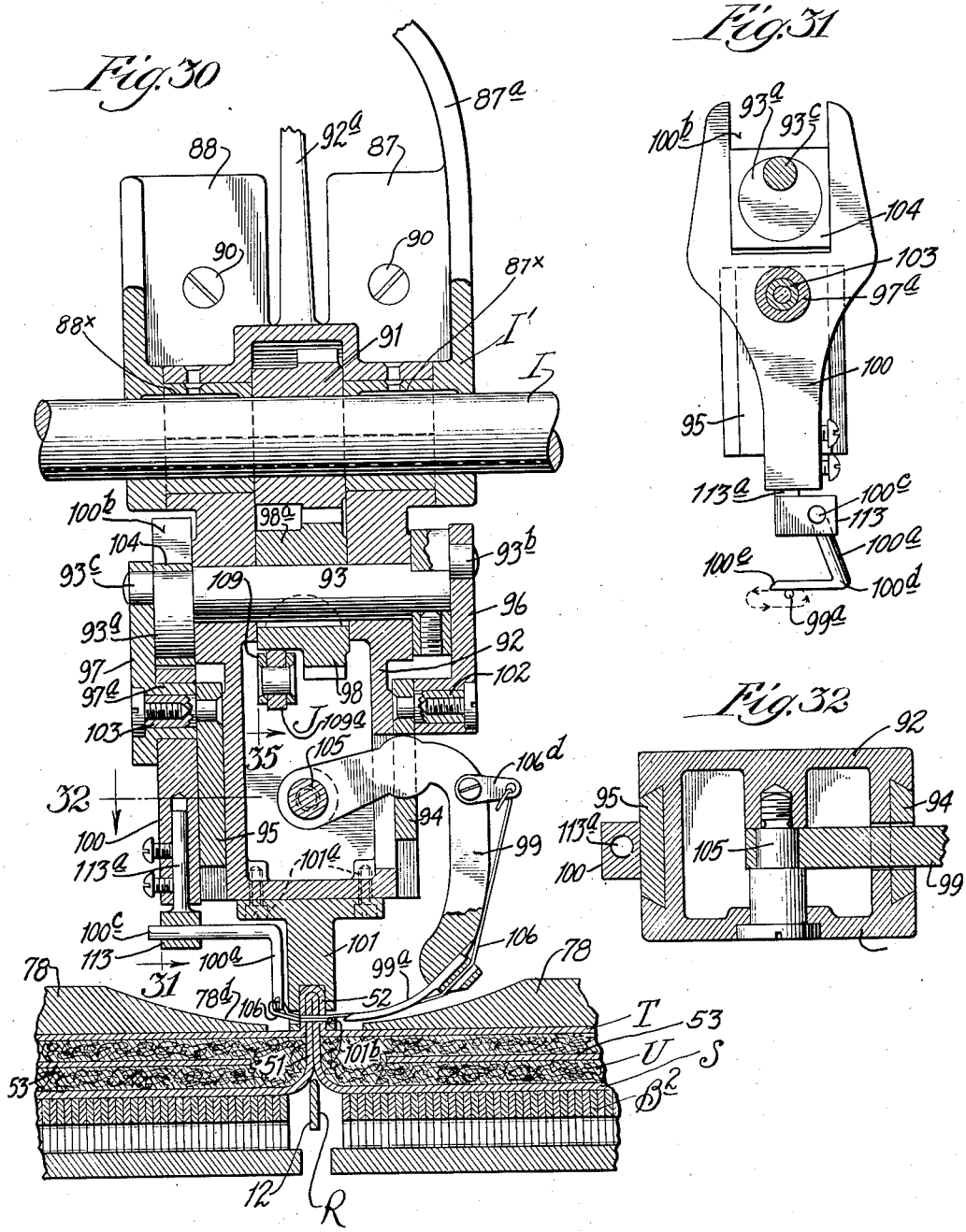

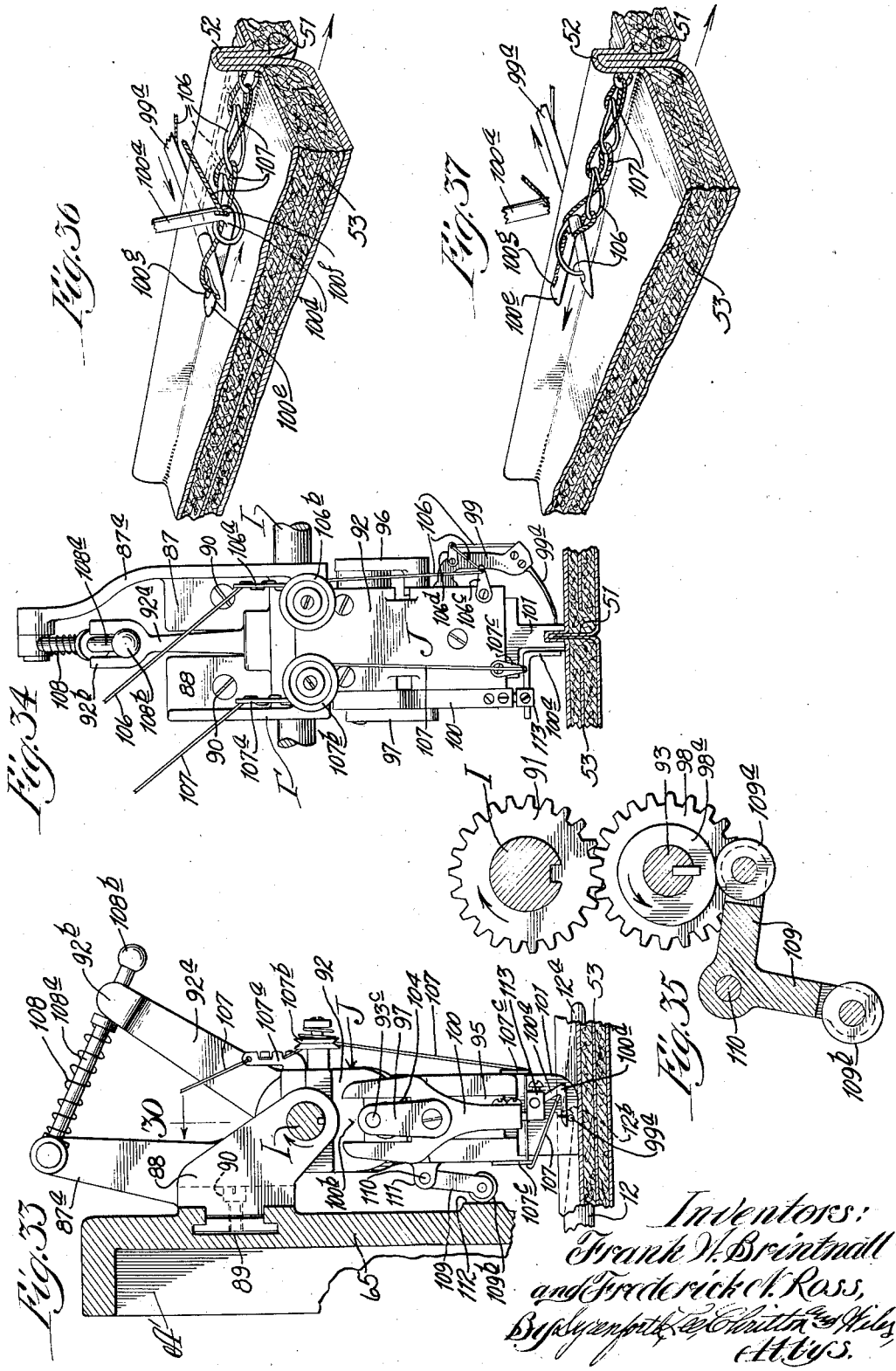

Sept. 29, 1931.  F. W. BRINTNALL ET AL  1,825,573
UPHOLSTERY MACHINE
Filed Oct. 5, 1928  15 Sheets-Sheet 15
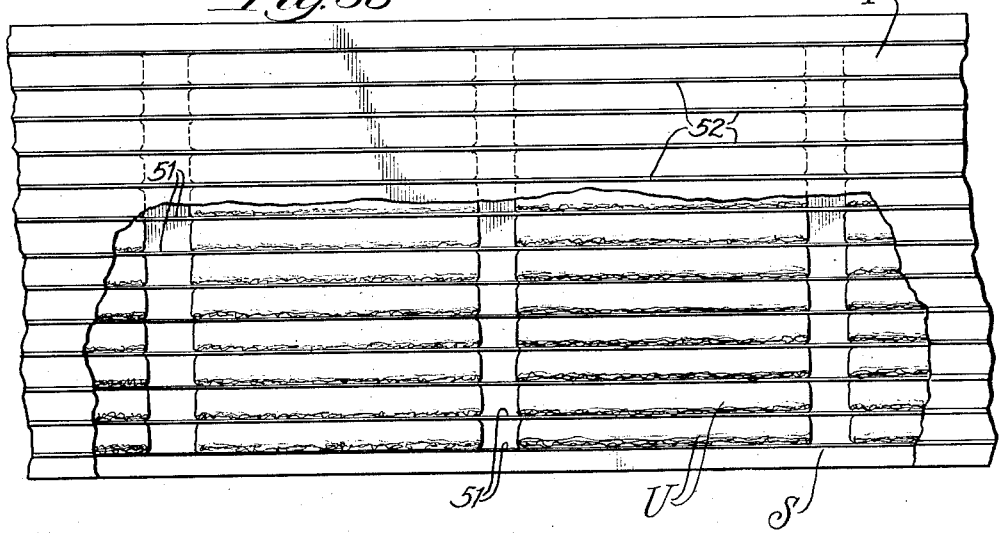
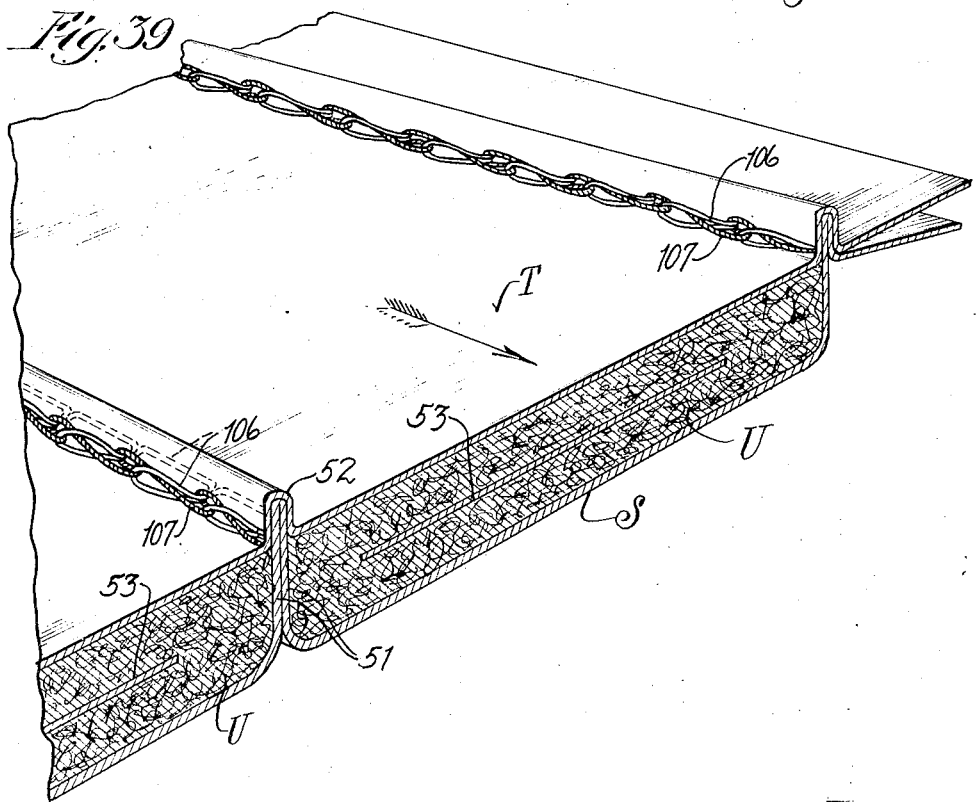

Patented Sept. 29, 1931

1,825,573

UNITED STATES PATENT OFFICE

FRANK W. BRINTNALL AND FREDERICK N. ROSS, OF DETROIT, MICHIGAN, ASSIGNORS, BY MESNE ASSIGNMENTS, TO NATIONAL AUTOMOTIVE FIBRES, INC., OF WILMINGTON, DELAWARE, A CORPORATION OF DELAWARE

UPHOLSTERY MACHINE

Application filed October 5, 1928. Serial No. 310,588.

This invention relates particularly to a machine adapted to the purpose of manufacturing cushions, or tubular upholstery.

The primary object is to provide an improved machine which is capable of producing a large output of pleated upholstery. The invention utilizes improved sewing mechanism producing a double chain stitch, commonly called a lock-stitch seam. It may be stated preliminarily that in the preferred embodiment illustrated in the accompanying drawings, the machine comprises: A bed over which the covering, or finish-fabric, of the upholstery is fed, the finish-fabric being carried through the machine on the relatively long ridge-forming, or seam-forming, chains, and the pleats, or pipes, being carried by relatively short wide chains arranged near the front end of the machine; a grooved seam-forming roll which co-acts with the ridging, or seam-forming, chains near their rear ends and which also cooperates with a series of creaser-shoes which form creases or relatively shallow seams in the lining or foundation fabric (the upper fabric), the forming-roll being carried by a vertically adjustable cross-head on which is also mounted a rock-member which may be swung about a pivot by mechanism mounted on the cross-head, said rock-member carrying the creaser-shoes and carrying also a wadding-breaker roll which is adapted to break the strips of batting at intervals, corresponding with the length of the cushions being formed, so as to leave skirt portions of the fabric without filling; a series of gathering devices arranged above the ridge-forming chains which carry the finish-fabric, these gathering devices cooperating with the ridge-forming chains in forming the U-shape seams, or ridges, which have their upper portions ultimately entered in the U-shape seams of the lining-fabric; a series of blades, or fingers, mounted on the bed of the frame a short distance in front of the front ends of the ridge-forming chains and serving to carry and heighten the seam as it passes from the ridge-forming chains to the sewing edge; a series of sewing mechanisms suspended on an actuating shaft journalled in brackets carried by the cross-head; and a pair of feeding-rolls (pulling-rolls) mounted at the front end of the machine, these rolls serving to draw the cushion between them and discharge the same at the front end of the machine.

Other instrumentalities associated with those mentioned are employed in the improved machine and will be more fully described. It may be stated at this point that strips of wadding, or batting, are led into the pleats, or pipes, as they are formed. These strips are preferably pre-formed bats which are drawn with the fabrics through the space between the forming-roll and the endless carriers, or chains. Obviously, however, the strips may be formed from cotton batting, or the like, in any desired manner. They may, for example, be formed by feeding sheet-cotton batting through a machine and cutting it by means of revolving cutters into suitable strips.

The accompanying drawings illustrate a preferred embodiment of the invention. In the drawings—

Figure 8:
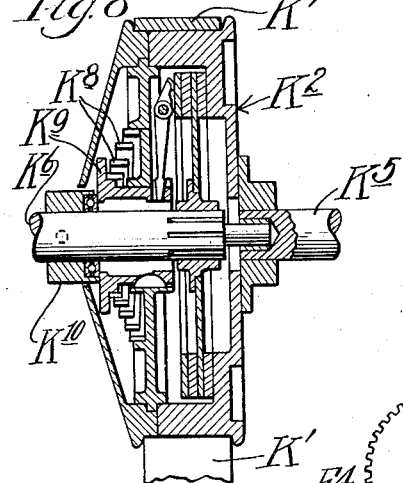
Figure 9:
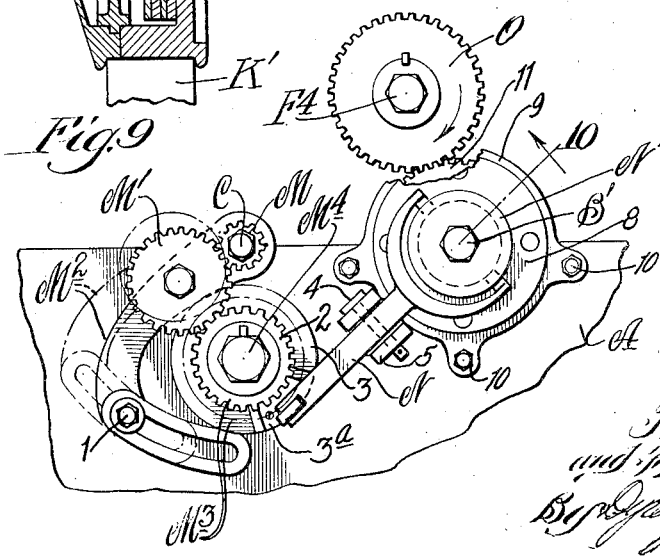
Figure 10:
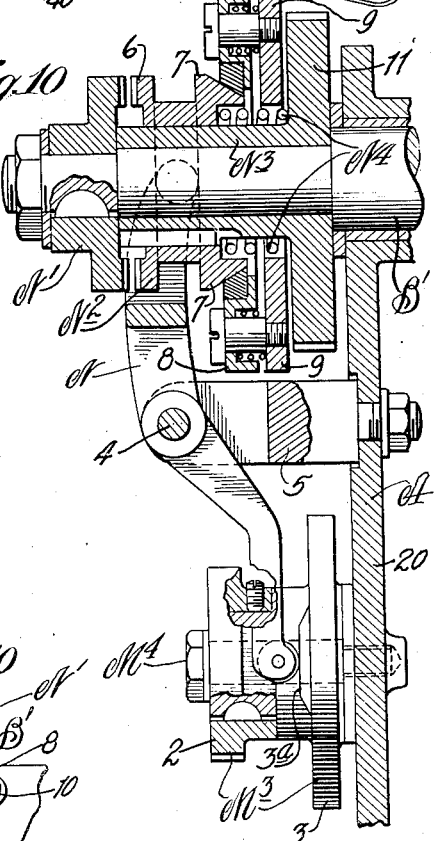

Fig. 1 is a side elevational view of the improved machine, the support of the strips of cotton batting being shown brokenly; Fig. 1ª, a broken elevational view showing a detail of the main clutch-controlling device employed; Fig. 1ᵇ, a broken plan section taken as indicated at line 1ᵇ of Fig. 1ª; Fig. 2, a broken front elevational view, the cushion being shown in section; Fig. 3, a broken plan view of the bed of the machine; Fig. 4, a broken plan view on a larger scale showing also some of the gathering devices associated with the ridge-forming chains; Fig. 5, a detailed vertical sectional view taken as indicated at line 5 of Fig. 4; Fig. 6, a broken view, taken as indicated at line 6 of Fig. 4 showing the rear sprocket-shaft on which are journalled the sprocket-wheels which carry the ridge-chains; Fig. 7, a diagramatic perspective view illustrating the features of the gearing employed; Fig. 8, an enlarged sectional view of the main clutch of the machine, the section being taken as indicated at line 8 of Fig. 7; Fig. 9, a broken elevational view illustrating a portion of the mechanism which appears in Fig. 7 at the right of and above the main clutch, this mechanism serving to control the operation of the wadding-breaker; Fig. 10, an enlarged broken sectional view taken as indicated at line 10 of Fig. 9; Fig. 11, a broken longitudinal vertical sectional view taken as indicated at line 11 of Fig. 2; Fig. 12, a broken transverse vertical section taken as indicated at line 12 of Fig. 11; Fig. 13, a broken view of the forming-roll; Fig. 14, a broken view of an interchangeable forming-roll having different spacing of the grooves; Fig. 15, a broken longitudinal vertical sectional view illustrating the relation of the cross-head and its attendant parts with respect to the carrier-chains, this view showing also a section of a cross-member mounted on the main frame and over which the strips of cotton batting pass as they are drawn between the lining-creasing shoes, the dotted lines indicating how the cross-head may be raised and the rock-member carrying the lining-creasing shoes, etc. may be swung about the pivot of the rock-member; Fig. 15$^a$, a plan view showing one of a series of adjustable sheet-metal shoes mounted on the cross-bars shown in Fig. 15 and cooperating with the breaker-roll; Fig. 16, a broken plan sectional view taken as indicated at line 16 of Fig. 15; Fig. 17, a broken transverse vertical sectional view taken at line 17 of Fig. 16; Fig. 18, a broken transverse vertical sectional view, on an enlarged scale, taken as indicated at line 18 of Fig. 11, the section at the left-hand portion of the figure being at the plane where the sewing is effected, while the other portion of the figure is somewhat further back; Fig. 18$^a$, a fragmentary longitudinal vertical sectional view taken as indicated at line 18$^a$ of Fig. 18; Fig. 19, a broken longitudinal vertical sectional view showing the relation of one of the seam-stretching blades over which the seam rides after it leaves the front end of the ridge-chain; Fig. 20, a broken side elevational view illustrating the manner in which the forming-roll is driven from the rear one of the sprocket-shafts which carry the short wide chains, this driving means permitting the raising and lowering of the cross-head by a sort of toggled arrangement of gears and chain; Fig. 21, a broken section taken as indicated at line 21 of Fig. 20; Fig. 22, a broken section taken as indicated at line 22 of Fig. 20; Fig. 23, a view showing the manner in which the rear sprocket-wheels of the ridge-chains are journalled on a stationary transverse shaft at the rear end of the machine; Fig. 24, a broken perspective view illustrating the manner in which the lining-fabric is straightened or stretched laterally on its course to the forming-roll; Fig. 25, a broken transverse vertical sectional view taken as indicated at line 25 of Fig. 11, illustrating the manner in which the upper feed-roll at the front end of the machine may be lifted away from the lower roll; Fig. 26, a view illustrating a slight modification, this modification permitting the upper roll to approach the lower roll when portions of the fabric carrying no cotton wadding pass between the rolls; Fig. 27, a broken perspective view illustrating the manner in which the fabrics and the strips of batts are fed to the forming-roll; Fig. 28, a perspective view illustrating the manner in which the sewing needle of any one of the series of sewing mechanisms is actuated; Fig. 29, a perspective view illustrating the manner in which the looper needle is actuated; Fig. 30, a broken transverse vertical sectional view of one of the sewing mechanisms, the section being taken as indicated at line 30 of Fig. 33; Fig. 31, a section taken as indicated at line 31 of Fig. 30, showing a detail of the means for actuating the looper needle; Fig. 32, a plan section taken as indicated at line 32 of Fig 30; Fig. 33, a broken sectional view taken as indicated at line 33 of Fig. 2 and showing the manner in which the sewing mechanisms are mounted on said cross-head; Fig. 34, a front elevational view of one of the sewing mechanisms; Fig. 35, a detailed sectional view taken as indicated at line 35 of Fig. 30 and illustrating the means by which the swinging of the sewing head is effected; Figs. 36 and 37, broken perspective sectional views illustrating the manner in which the sewing thread loops and the lock thread loops become interlocked; Fig. 38, a broken plan view illustrating a connected series of cushions, with the cotton strips broken between cushions; and Fig. 39, a broken perspective view showing a portion of the cushion and illustrating the seams thereof.

In the embodiment illustrated: A (Figs. 1, 2, 16 and 17) designates the main frame of the machine which is equipped near its front end with a vertically movable cross-head A' and which also has a rearward extension A$^2$ which constitutes a portion of the bed of the machine; B (Figs. 3, 7 and 11), a main drive-shaft journalled in the front end of the frame; B', a companion shaft journalled in the frame some distance back of the shaft B; B$^2$, a series of wide pleat-carrying chains mounted on the shafts mentioned, said chains being separated by spaces; B$^3$, a feed-roll co-acting with the front portions of the chains B$^2$; C and C', front and rear sprocket-shafts, respectively, upon which are mounted a series of narrow, relatively long fabric-ridging chains C$^2$, the shaft C being disposed about midway between the shafts B and B'; D (Figs. 4, 11, 12 and 27), a system of fabric-gathering devices co-acting with the ridge-chains C$^2$; E, a forming-roll journalled in the cross-head A' and vertically movable therewith; F, a rocking-member fixedly supported on a shaft F' and journalled in the cross-head A' (Figs. 11 and 15), said rocking-member being adapted to be swung about its pivotal support through the medium of a device $F^2$; $F^3$, a cross-shaft constituting a part of the member F; $F^4$, a breaking shaft journalled in the lower portion of the member F and equipped with tubular spiked breaker-members $F^5$ (Figs. 7 and 27); $F^6$, a series of creaser-shoes, or plates, adjustably mounted on the shafts $F^3$ and $F^4$, the devices $F^5$ being interposed between the members $F^6$, it being understood that the front edges of the shoes $F^6$ are adapted to cooperate with the grooves of the forming-roll E so as to crease the lining-fabric; G (Figs. 4, 15 and 27), a cross-bar disposed above the endless chains a short distance back of the forming-roll E, said cross-bar having its ends mounted on the side-members of the main frame and serving as a guide over which the strips of cotton batting pass; H, a series of transverse bars carried by the frame, upon which are mounted a series of transversely adjustable longitudinally extending chain guides H' from which depend hangers $H^2$ (Figure 12) which serve to support the return portions of the chains $C^2$; I (Figs. 2 and 11), a transversely extending actuating shaft journalled in brackets I' which are adjustably connected with the front side of the beam of the cross-head A', said shaft being provided with an extensible jointed section $I^2$ which, as shown in Figs. 2, 7 and 16 has a portion $I^3$ journalled in the front posts $A^3$ of the main frame, these posts being equipped with guides with which are connected the slides of the cross-head A'; J, a series of sewing mechanisms suspended from bearings $87x$ and $88x$ of the bracket members 87 and 88 respectively, in which bearings is journalled the actuating shaft I, said sewing mechanisms being adjustable transversely of the machine to enable pleats of varying widths to be made; K (Figs. 1, 7 and 8), an electric motor whose armature shaft is connected by a belt K' with a main clutch $K^2$ through the medium of which is driven a worm $K^3$ which meshes with the worm-wheel $K^4$ secured on the end of the main drive-shaft B of the machine; L, a sprocket-chain driven from the shaft of the worm $K^3$ and serving to actuate a short longitudinal shaft L' which is equipped at its front end with a bevel-gear $L^2$ meshing with a bevel-gear $L^3$ splined on the section $I^3$ of the sewing-mechanism actuating shaft I; M, a pinion fixed to the end of the shaft C and meshing with an idler M' carried by a segment $M^2$ which has one end pivoted on the shaft C and the other end adjustably connected, as indicated at 1 with the frame; $M^3$, a combination cam and gear journalled on the stud $M^4$ carried by the frame, the gear-member which is designated 2 meshing with the idler-gear M' and the cam-disk designated 3 being separable from the gear, the cam-disk 3 carrying on its front face a cam-portion $3^a$; N, a clutch-controlling lever mounted on a pivot 4 supported by a bracket 5 projecting from the frame; N' a clutch-member fixed to and rotating with the sprocket-shaft B'; $N^2$, a sliding clutch-member mounted on the shaft B' and having a jaw clutch-portion 6 co-acting with the clutch-member N' and having a friction clutch-portion 7 co-acting with a fixed friction clutch-member 8 carried by a ring 9 which is secured by bolts 10 to the frame A; $N^3$, a sleeve, or short tubular shaft, journalled on the shaft B' and equipped with a gear 11 with which meshes (when the cross-head A' and the rock-member F are in normal position) a gear O on the breaker-shaft $F^4$; $N^4$, a spring encircling the sleeve $N^3$ and normally holding the clutch-member $N^2$ in engagement with the clutch-member N', so that the gear 11 will be rotated with the shaft A' and thus will serve to actuate the breaker-shaft $F^4$; P (Figs. 3 and 7), a chain gearing the main shaft B to the front shaft C; Q (Figs. 7, 20–22), means whereby power is transmitted from the shaft B' to the forming-roll E, said means permitting the roll E to rise with the cross-head without disconnecting the gearing; R (Figs. 3, 11 and 19), a series of laterally adjustable seam-heightening devices, or guide-plates which co-act with the high links of the ridging chains $C^2$, each of said devices comprising a long narrow blade 12 which extends rearwardly into the space between two rows of high links which constitute a portion of the ridging-chain; S, the finish-fabric of the cushion which is taken from a roll S' suspended from the frame-extension $A^2$; T, a lining-fabric, or foundation cloth, which is taken from a roll T' supported in an elevated position in the rear of the forming-roll; and U, the strips of cotton batting taken from rolls, or piles, U' supported on a stand $U^2$ which is disposed in the rear of the cushion-forming machine, the strips U being drawn to the machine over suitable guides $U^3$ and entering between the finish-fabric and the lining-fabric as will be understood from Figs. 1 and 27.

Referring to Figs. 1, $1^a$, $1^b$, 7 and 8, the main clutch $K^2$ of the machine is controlled by a device V which is provided with a front pedal 13 and a rear pedal 14. The device is so constructed that the machine may be stopped by means of either pedal. On the other hand, the machine cannot be started except through the medium of a front pedal. The pedal 13 is rigidly connected with a rock-shaft 15 which also has rigidly connected therewith a short arm $11^a$ which is connected by a link $11^b$ with a rock-member 16 which controls the clutch $K^2$. The pedal 14 is carried by a sleeve $14^a$ journalled on the rock-shaft 15; and the sleeve $14^a$ is equipped with a short arm 14$^b$ which is connected by a rod 14$^c$ with the bell-crank lever 16. Downward movement of the pedal 14 is limited by a stop 14$^d$ which projects from the frame A of the machine.

The clutch K$^2$ is of known construction. The clutch-members have connected with them a shaft K$^5$ and a shaft K$^6$, the former supported in a large bearing K$^7$ and the latter serving to drive the worm K$^3$ and the chain L, as shown in Fig. 7. The clutch is equipped with a spring K$^8$ which tends to thrust the sleeve K$^9$ to the left, as shown in Fig. 8, thus holding the clutch in engagement. By moving the member K$^9$ to the right through the medium of the collar K$^{10}$ and the yoke of the lever 16 shown in Fig. 1, the clutch is disconnected.

The pedal 13 has mounted thereon a bell-crank lever 17 whose elbow-portion is journalled on a stud 18 carried by the pedal 13. The short arm of the member 17 is equipped with a spring 17$^a$ which engages a stud 17$^b$ with which the pedal 13 is equipped. The long arm of the member 17 is equipped with a stud 17$^c$ which works in a cam-slot 19 with which a plate 19$^a$ carried by the main frame is provided. In the position shown in Fig. 1$^a$, the stud 17$^c$ engages the upper portion of the cam slot 19. This corresponds with the position when the machine is operating. By means of either foot pedal, the member 16 may be swung to the right, as viewed in Figs. 1 and 1$^a$ to throw the clutch K$^2$ out of operation. If it be desired to hold the machine out of operation, the pedal 13 may be depressed. In that case, the stud 17$^c$ will ride down the inclined guide 19$^b$ and finally enter the recess 19$^c$ which will hold the pedal locked in the lowered position. By again lowering the pedal 13, the stud 17$^c$ may be released from engagement with the recess 19$^c$, and the spring 17$^a$ will serve to throw the member 17 in the direction to cause the stud 17$^c$ to ride up the slot 19$^d$ and finally to the position shown in Fig. 1$^a$. The stop 14$^d$ prevents the pedal 14 from being depressed sufficiently to release the stud 17$^c$ from the recess 19$^c$. On the other hand, the arm carrying the pedal 13 may be depressed or sprung downwardly sufficiently to effect such release and thus permit the main clutch K$^2$ to be thrown to the operative position.

The frame A of the machine may be of any desired construction. In the illustration given, the frame comprises heavy end-standards 20 and heavy cross-bars 21, 22, 23, 24, 25 and 26 (Figs. 3, 11 and 19). Of these members, the members 22—25, as well as the members H, serve as supports for the laterally adjustable longitudinal chain-supporting bars H'.

The bars H' are secured to the transverse members by means of clips 27 and screws 28. As shown in Figs. 11 and 12, the clips engage slots with which the cross-members are provided. The hangers H$^2$ are composed of longitudinal bars 29 and stirrups 30 which are attached to the bars H'. The bars are slotted to support the lower or return members of the chain C$^2$. These chain-supports and guides which have been described may be adjusted laterally to correspond with the width of the pleat.

The shafts C and C' are equipped with sprocket wheels 31 which support the ridge-chains C$^2$. As shown in Fig. 19, the front sprocket-wheels 31 are keyed to the shaft C; and as shown in Fig. 23 the rear sprocket-wheels 31 are journalled on the shaft C', being confined between adjustable collars 32. Thus, the sprocket-chains may be adjusted on the shafts to correspond with the distance between seams.

The manner of supporting the rear shaft C' will be understood from Figs. 4–6. The rear portion of the frame A$^2$ is provided with longitudinal dove-tailed grooves 33 in which are mounted adjustable slides 34 adapted to be adjusted by set-screws 35 interposed between the slides and shoulders 36 with which the frame is provided. The shaft C' has its ends rigidly secured in the adjustable supports 34. By means of adjustment, the desired tautness may be given to the ridge-chains.

The finish-fabric S passes over the rear sprocket-wheels and beneath a semi-cylindrical shield 37 which is carried by arms 38 which extend rearwardly from the rearmost cross-bar H (Figs. 4 and 5).

As appears from Fig. 23, the sprocket-wheels are provided with central grooves 31$^a$ adapted to be engaged by inner projections with which the links of the chains are provided. As shown in Figs. 15, 18 and 19, the ridge-chains C$^2$ are provided with two rows of high links 39 which are separated by a space; and these links are flanked at their base by low links 39$^a$, two or three at each side.

The short wide chains B$^2$ which carry the pleat, or pipe-portions, of the cushion are carried by sprocket-wheels 40 which are laterally adjustable on the shafts B and B' to correspond with the spacing of the pleats of the cushion.

The system of fabric-gathering devices D which overlie and cooperate with the ridging-chains C$^2$ comprise a series of transverse tubular bars 41 (Figs. 3, 4, 11 and 12); hangers, or brackets, 42 adjustably mounted on the transverse members 41; and longitudinally disposed sheet-metal shoes 43 suspended from the lower sides of the bracket-rings 42. The shoes are of a cross-section shape shown in Fig. 12. Thus, they are provided with upwardly extending channel-portions 43$^a$ and lateral wings 43$^b$. The channels afford a passage for the high links of the ridge-chains and the wings serve to depress the finish-fabric to provide the fullness which is necessary for the pleats, or pipes. As appears from Fig. 27, front ends of the members 43 have connected therewith hangers 44 which are laterally adjustable in a T-slot 45 with which the cross-bar G is provided. The members 43 are laterally adjustable so as to be properly centered over the ridge-chains in any position of adjustment thereof. As shown in Fig. 4, which represents one-half of the system of shoes 43, the rear extremities of the gathering devices occupy successively advance positions with reference to the rear end of the central device. The purpose is to first make the necessary gathering of the material at the center ridge-chain and then successively at the several ridge-chains on either side of the central one.

The lateral edges of the finish-fabric S are indicated at 46, showing in a general way how the cloth is drawn in as it is gathered. It is preferred to mount upon the cross-bars 41 a device comprising a motor 47 and rotary brushes 48 actuated thereby, these brushes rotating in the direction indicated by the arrows and because of their oblique disposition tending to stretch the cloth laterally and prevent it from becoming wrinkled. One of these cloth-smoothing devices (equivalent to a frictional holding device) is mounted at each side of the machine. The lateral edges of the cloth are confined between the brushes and surfaces 49 over which the lateral margins of the cloth pass.

The forming-roll E is provided with circumferential grooves 50 which correspond in spacing with the spacing of the seams of the cushion.

Figs. 13 and 14 show interchangeable rolls E and E' in which grooves 50 are differently spaced to correspond with different spacings of the seams. As appears from Fig. 4, the central portions 43ª of the shoes 43 are in alinement with the grooves 50 of the forming-roll.

Referring to Figs. 38 and 39, the finish-fabric S of the cushion is provided with high upstanding U-shape seams 51 whose upper portions are received in the upper portion of the relatively low U-shape seams 52 with which the lining-fabric T is provided. The cotton batts U are shown as having therein longitudinal strips of reinforcing paper 53. If desired, these reinforcing strips may be omitted.

The forming-roller E is equipped at one end (Figs. 7, 20–22) with a sprocket-wheel 54 through the medium of which the forming-roll is driven by means of a chain 55 which connects with an idler sprocket-wheel 56 which is integral with or rigidly secured to an idler-gear 57 which meshes with a gear 58 secured on the shaft B'. The idler-sprocket and gear 56 and 57 are journalled on a stud 59 which is secured to a housing-member 60 which is journalled on a reduced portion of the shaft B'. It will be understood that when the cross-head A' which carries the forming-roll E is lifted, the stud 59 may swing about the shaft B' as a pivot. As shown in Figs. 21 and 22, a short bar, or link, 61 connects the stud 59 and the shaft E; and the member 61 carries a housing-band 61ª for the sprocket-chain. Thus it will be understood that the stud 59 forms a scissors joint between the housing-member 60 and the member 61.

As will be understood from Figs. 2, 15 and 27, the frame F which is capable of being swung about the shaft F' is actuated by the mechanism F². This mechanism comprises a worm-wheel 62 which is fixedly secured on one end of the shaft and a worm 63 meshing therewith, the worm being journalled in lugs 64 with which the cross-head A' is equipped.

The cross-head A' comprises a deep heavy bar, or cross-beam, 65 (Figs. 2, 16 and 17), which has its ends secured by bolts, or cap-screws, 66 to slides 67. The slides are provided with T-heads 67ª which are movable in vertical guides 68 with which the front corner posts of the frame A³ are provided. The guides have removable strips 68ª secured by bolts, or cap-screws, 68ᵇ. The slides 67 are provided with vertical passages in which are mounted nuts 69 through which work vertical screws 70. These screws have shanks 71 journalled in the frame A. The shanks are equipped with collars 72 which rest upon ball bearings 73. The lower ends of the screw-shafts are equipped with bevel-gears 74 which mesh with bevel-pinions 75 on a cross-shaft 76 which is equipped at one end with a crank 77. The crank may be operated to turn the shaft 76 and thereby rotate the screws, thus causing the cross-head A' to be raised or lowered, at will.

The lower edge of the cross-beam 65 of the cross-head has connected therewith a series of laterally adjustable shoes 78 which, as will be understood from Figs. 11, 18 and 18ª have dove-tailed connections with the lower edge of the beam, and are secured in position by set-screws 78ª. The pleats, or shoes, 78 have concaves 78ᵇ which conform to the forming-roll E, and the shoes 78 also have longitudinal grooves 78ᶜ which register with the grooves 50 of the forming-roll.

As appears from Figs. 18 and 18ª, the outer shoes 78 which do not engage stuffed pleats are provided with leaf-springs 79 which are adapted to press the plies of cloth against the carrier-chains B², the effect being to hold the lateral margins of the fabric properly in position on the chain and prevent the lateral portions from being drawn inwardly unduly. On the other hand, the shoes 78 beneath which the stuffed pleats pass need not be provided with such springs. Here, the shoes 78 are adapted to compact the stuffed pleat closely against the carrier-chain B², as will be understood from the left-hand portion of Fig. 18. Portions of shoes 78 are shown in Fig. 2 where the roll B³ is broken away. It there appears (see also Fig. 18) that the front end-portions of the shoes are provided with cancavities 78ᵈ. That is, the metal is cut away to afford room for the sewing needle and looper needle of the sewing mechanism to operate. The edge-portions of the shoes are separated from each other by spaces 80 which are in alinement with the ridge-chains, so that the seams of the fabrics can be carried through beneath the cross-beam and between the shoes 78.

The means whereby the nested seams of the fabric are carried to the sewing mechanism will be understood from Figs. 11 and 19. The blades 12 which have reduced extremities 12ᵃ which extend between the spaced high ridge-links 39 are carried by laterally adjustable blocks 81 mounted on the cross-bars 22 and 23. Associated with the blocks 81 are clamping-blocks 82 equipped with cap-screws 83 which extend in the tapped openings with which the blocks 81 are provided. Thus, the blocks 81 and 82 may be clamped to the cross-members 22 and 23. When desired, the devices R may be adjusted laterally to correspond with the spacing of the seams. The blade 12 has a slightly inclined upper edge which serves to heighten the seam and flatten it after the seam leaves the ridge-chain. The blade is provided with a hook 12ᵇ which affords a recess through which the sewing needle works. This will be understood by reference to Figs. 19 and 33.

Referring again to the breaker-roll F⁴, this comprises (Figs. 15 and 27) a shaft having the sleeves F⁵ mounted thereon, these sleeves being provided with spike-like projections, or teeth, 84. The bar G is provided with adjustable shoes 85 (Figs. 15 and 15ᵃ). These shoes are secured to the bar by means of bolts 86. The shoes rest on the upper concave surface of the member G and are provided at their extremities with slots 85ᵃ through which the teeth 84 may extend as the breaker-roll F⁴ rotates. The purpose is to cause the teeth to penetrate the paper 53 in the batt (see Fig. 39), so that when the breaker-roll is arrested, the strips will be broken with certainty.

The manner in which the sewing mechanisms J are mounted and operate will be understood from Figs. 2, 16, and 28–38. Those brackets I' which are closely associated with the several sewing mechanisms are divided. That is, each of these particular brackets comprises a member 87 and a member 88. The base of each member is divided and is clamped to a T-slot 89 in the beam, as shown in Figs. 16 and 33, by means of cap-screws 90.

The shaft I is equipped with a series of gears 91, one corresponding with each sewing-head. Each sewing mechanism comprises a head, or frame, 92 suspended from the bearings 87ˣ and 88ˣ of the bracket members 87 and 88 and equipped at its upper end with an arm 92ᵃ; a short shaft 93 journalled in the head and disposed parallel with the shaft I, the shaft 93 being equipped with an eccentric 93ᵃ and with crank-pins 93ᵇ and 93ᶜ; slides 94 and 95 connected with the opposite lateral sides of the head 92; links 96 and 97 connecting the slides with the crank-pins 93ᵇ and 93ᶜ, respectively; a gear 98 meshing with the gear 91 and a cam 98ᵃ formed integrally with the gear 98; a sewing-needle arm 99 actuated by the slide 94 and equipped with a sewing needle 99ᵃ; and a looper-needle arm 100 actuated with the slide 95 and equipped with a looper needle 100ᵃ; and a seam-embracing member 101 secured to the lower end of the head, as by means of screws 101ᵃ.

The link 96 is pivotally connected with a stud 102 secured to the upper end of the slide 94. The link 97 is provided with a tubular bearing 97ᵃ which is journalled on a pivot-stud 103 which is secured to the upper end of the slide 95. The looper-needle arm 100 is journalled on the tubular member 97ᵃ. The upper end of the arm is provided with a slot 100ᵇ which is engaged by a block 104 journalled on the eccentric 93ᵃ. It will be understood that as the shaft 93 rotates, the looper-needle arm will be raised and lowered and will at the same time be swung so as to carry the looper needle in a plane parallel with the plane of the seam.

The sewing-needle arm 99 swings in a transverse plane about a pivot 105 which is mounted within the head 92. The arm extends through slots in the side-wall of the hollow head and in the slide 94 in such manner that the arm will be actuated by means of the slide 94. The sewing needle 99ᵃ is curved to correspond with the arc of a circle struck from the pivot 105. The seam-embracing member 101 is provided at its lower end with a transverse recess 101ᵇ through which the sewing needle works.

The sewing thread is designated 106; and the looper thread, or lock-stitch thread, is designated 107. The head is equipped with tensioning devices 106ᵃ, 106ᵇ and 106ᶜ for the sewing thread. Also, the sewing-needle arm 99 is equipped with a guide 106ᵈ which serves to take up the loop of the sewing thread after the stitch has been made.

The sewing head is further equipped with tensioning devices for the looper thread 107, these tensioning devices being designated 107ᵃ, 107ᵇ and 107ᶜ.

The thread 107 passes from the tensioning-member 107ᶜ to the looper needle. The looper needle 100ᵃ, as will be understood from Figs. 29, 30, 33 and 36, has a transversely extending shank-portion 100ᶜ and an elbow-portion 100ᵈ. The elbow-portion moves in a plane parallel with the seam, the point-portion 100ᵉ of the needle being directed rearwardly. The needle is provided at its elbow with a guide-perforation 100ᶠ, and near its point with the guide-perforation 100ᵍ. The thread 107 passes from the tensioning-device 107ᶜ through the guides with which the needle is provided.

It is advantageous in this type of machine to feed the work continuously through the machine, and this is the manner of operation in the present machine. Accordingly, the sewing mechanisms J are adapted to move forward while the sewing needles are in engagement with the seam and to be retracted to the normal position to enable a fresh stitch to be made. The movement is accomplished by swinging the heads about the axis of the actuating-shaft I as a pivot. The normal position of the head is shown in Fig. 33. The head is yieldingly held in this position by means of a spring 108 confined between the arm 92ᵃ and an arm 87ᵃ with which the bracket-member 87 is equipped. The arm 87 has pivotally connected therewith a rod 108ᵃ which works through a yoke 92ᵇ on the arm 92ᵃ, the rod 108ᵃ having a head 108ᵇ which serves as a stop.

The head is adapted to be swung forwardly by means of a bell-crank lever 109 whose elbow-portion is supported on a pivot 110 carried by a slotted lug 111 with which the frame, or head, 92, is equipped at its rear side. The member 109 has an arm extending into the head and equipped with a roller 109ᵃ which engages the cam 98ᵃ. The external arm of the member 109 is equipped with a roller 109ᵇ which engages a cam surface 112 with which the beam 65 is provided on its front surface.

In the sewing operation, the point-portion of the looper needle 100ᵉ describes approximately an elongated longitudinal ellipse, the point crossing above the sewing needle as it (the looper needle) moves rearwardly to carry its loop through the sewing-thread loop (Fig. 37), and the point of the looper needle being retracted while in the lowered position so as to enable the sewing needle to cross above it and carry the sewing-thread loop through the looper-thread loop (Fig. 36). The loops of the two threads thus become interlocked. In Figs. 36, 37 and 39, the looper thread appears dark, while the sewing thread appears light.

As will be understood from Figs. 29 and 30, the looper needle has its shank 100ᶜ carried by a block 113 which depends from a shank 113ᵃ adjustably secured in a socket with which the lower end of the arm 100 is provided.

From the description given, the operation will be readily understood. The finish-fabric S is fed through the machine primarily by means of the ridge-chains C² which produce the U-ridges 51 shown in Fig. 39. The lining-fabric and the batting strips are drawn through the machine between the traveling-chains and the forming-roll E. The lining-fabric is preparatorily grooved or seamed by passing over the shoes F⁶ which extend into the grooves of the forming-roll. Thus, the shallow U-ridges 52 shown in Fig. 39 are ready to receive the ridges, or seams, 51 as they are carried through the grooves of the forming-roll on the ridge-chains. After passing the forming-roll, the seams are heightened and made thinner by being stretched over the blades, or fins, 12, over which blades the seams ride on their way to the needles (Fig. 19).

At predetermined intervals, the rotation of the breaker-roll F⁴ is interrupted through the operation of the cam M³ (Figs. 7 and 9). When the clutch N² is automatically thrown to the right in the manner illustrated in Fig. 10, so that the driving of the gear 11 is discontinued, the friction clutch-member 7 is brought into engagement with a stationary friction clutch-member 8. That is, these friction clutch-members serve as a brake which effectively holds the breaker-roll F⁴ against rotation during the period when the cotton strips are being broken. The rotation of the breaker-roll is arrested for a sufficient time to provide the desired width of skirts at the marginal portions of the cushions (see Fig. 38).

The length of the batting strips in the cushions may be changed as desired. This may be done by substituting for the gear 2 at M³ a gear of different size, the arm M² being readjusted as may be necessary. If it be desired to hold the breaker-roll F⁴ for a longer time against rotation, this may be done by substituting for the cam-segment 3ᵃ another cam-segment of different length.

In the illustration given, the lining-fabric T is taken from a roll T'. It is preferred to pass the fabric over a stretching roller 114, as shown in Fig. 24. The roll is held between tension-plates 115 (one shown); and the cloth passes about the roller 114, which may be an idler, thence over another idler 116, and thence to the forming-roll. The idler 114 is provided with suitably arranged spiral ribs 114ᵃ and 114ᵇ which serve to stretch the cloth laterally as it passes over the idler. The idler 116 may be equipped with suitable spirals for the same purpose, if desired. It will be understood that where idlers are employed in this manner, it is necessary that the cloth be drawn under tension over the idlers.

Where it is not desired to break the cotton strips between cushions, the arrangement of the feed-roll B³ shown in Fig. 11 may be used advantageously. This arrangement is shown in detail in Fig. 25. As there shown, the roll B³ comprises an inner shaft 117 and an outer tubular shaft 118. The outer tubular shaft is journalled on eccentrics 117ª with which the inner shaft is equipped; and the inner shaft is equipped with a handle 117ᵇ by means of which the eccentrics may be operated to lift the tubular roll B³ away from the work, when desired.

In the modification shown in Fig. 26, the solid roll B⁴ is employed in lieu of the roll B³ previously described. The roll B⁴ is journalled in arms 119 which are pivotally connected by means of the shaft 120 with arms, or housings, 121 which are pivoted on the shaft B. The arms 119 have extensions 119ª which are slidably connected with studs 122 which rise from the frame A and which are connected by pivots 122ª with the frame. These studs are equipped with followers 122ᵇ which engage the arms 119ª. Between these followers and nuts 122ᶜ are confined springs 122ᵈ.

The shaft of the roll B⁴ is connected to the idler-shaft 120 by sprocket connections 123. The springs serve to hold the feed-roll B⁴ yieldingly against the cushion carried by the feed-chains B². At points where the batting strips are interrupted between cushions, the roll B⁴ will nevertheless be forced against the fabrics, so as to insure proper feeding action; and the roll B⁴ can rise as much as may be necessary without disturbing the gearing connections.

While the improved machine is adapted to the purpose of producing continuous lengths of pleated upholstery which can be cut into desired sizes for cushions, it is to be observed that the finish-fabric may, if desired, be precut so as to provide separate coverings for the several cushions; and the coverings may be fed into the machine in proper sequence. Some saving in the use of the finish-fabric may be effected in this way.

The improved machine is capable of rapid production work. The string of connected cushions may be severed between cushions; and the cushions may be applied to frames equipped with upholstery springs. In such case, suitable pads of burlap and cotton batting may, if desired, be placed upon the springs before the cushions are applied. Cushions may be secured by tacking the skirt portions to the frame.

While an actuated swinging-head is desirable in some cases, especially where long stitches are to be taken, the invention is not necessarily limited in this respect. Also, certain features of the invention are capable of broad application. As an illustration, the intermittent stoppage of the strips of batting and severance of the batts, thus providing unfilled pleats between cushions, is a feature which may be advantageously employed in machines of other types for forming stuffed upholstery. Other broadly novel features of invention are herein disclosed.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. In combination with means for feeding plies of fabric and strips of batting: a movable head at one side of said fabric; a sewing needle mounted on said head and adapted to carry a sewing thread; a looper device mounted on said head and adapted to carry a looper thread; and actuating means comprising means for advancing the head with the work while the sewing needle is in engagement with the seam and retracting the head, and means for actuating the sewing needle and the looper device.

2. In combination with means for feeding plies of fabric and forming the same into pipes with intervening outstanding seams and feeding the strips of batting into said pipes: a movable head; a sewing needle mounted on said head and adapted to work through the seam; a looper needle mounted on said head and adapted to work adjacent one side of the seam; means mounted on said head serving to actuate said needles in timed relation; and means for advancing the head with the work while the sewing needle is in engagement with the seam and then retracting the head.

3. In combination with means for feeding plies of fabric and forming the same into pleats and outstanding seams between the pleats, said means including ridge-forming chains and a co-acting forming-roll provided with grooves corresponding with the ridge-forming chains: a movable head; a sewing needle mounted on said head and adapted to work through the seam; a looper needle mounted on said head and adapted to work adjacent one side of the seam; means mounted on said head serving to actuate said needles in timed relation; and means for advancing the head with the work while the sewing needle is in engagement with the seam and then retracting the head.

4. In combination with means for feeding plies of fabric and intervening strips of batting and forming the fabrics to provide pleats and intervening nested outstanding seams, such means including pleat-carrying chains, ridge-forming chains, and a forming-roll provided with grooves corresponding with the ridge-forming chains: a movable head; a sewing needle mounted on said head and adapted to work through the seam; a looper needle mounted on said head and adapted to work adjacent one side of the seam; means mounted on said head serving to actuate said needles in timed relation; and means for advancing the head with the work while the sewing needle is in engagement with the seam and then retracting the head.

5. In a machine of the character set forth: means for feeding a plurality of plies of fabric and intervening strips of batting and effecting sewing of the fabric between said strips; and a device co-acting with the strips of batting and adapted to periodically arrest the feed of said strips and effect severance thereof.

6. A machine as specified in claim 5, in which the means for effecting severance of the strips comprises a rotating member equipped with means for engaging the strips, and means for periodically arresting the rotation of said member to cause severance of the strips.

7. A machine as specified in claim 5, in which the means for effecting severance of the strips comprises a positively driven rotary shaft and a series of spaced toothed sleeves mounted on said shaft and adapted to engage the strips, and means for periodically throwing said shaft out of gear and applying a brake thereto, whereby severing of the strips is effected.

8. A machine of the character specified in claim 5 wherein the means for effecting severance of the strips comprises a breaker-roll mounted on a swinging frame, and means for positively actuating the breaker-roll and periodically arresting its rotation and holding the roll to effect breaking of the strips.

9. In a machine of the character set forth: means for feeding a plurality of plies of fabric and intervening strips of batting and forming nested seams from the fabrics, said means comprising an adjustable cross-head, a forming-roll journalled in said cross-head and provided with peripheral grooves, seam-forming shoes associated with said forming-roll, and a swinging frame mounted on said cross-head and carrying said shoes.

10. A machine as specified in claim 9, in which the swinging frame is equipped also with a breaker-roll equipped between the shoes with teeth for engaging the padding strips.

11. A machine as specified in claim 9, in which the swinging frame has journalled therein a breaker-roll equipped between the shoes with teeth for engaging the strips of batting; and means for positively driving said breaker-roll and for periodically arresting and holding the breaker-roll to effect breaking of the strips.

12. In a machine of the character set forth, means for feeding a plurality of plies of fabric and intervening strips of batting and forming from the fabrics nested outstanding seams, said means comprising a vertically movable cross-head; a forming-roll journalled in said cross-head; a shaft journalled in said cross-head and equipped with a swinging frame; means mounted on the cross-head for turning said shaft to effect swinging of said frame; and a breaker-roll journalled in said frame and equipped with means for effecting breaking of the strips of batting.

13. In a machine of the character set forth: a bed comprising endless ridge-forming chains adapted to carry a finish-fabric through the machine; a cross-head adjustably mounted on said frame; a series of sewing mechanisms mounted on said cross-head; a forming-roll journalled on said cross-head and provided with peripheral grooves corresponding with the ridge-forming chains; and a swinging frame mounted on said cross-head and equipped with a plurality of corresponding shoes coacting with said grooves and adapted to effect creasing of the lining-fabric.

14. A machine as specified in claim 13, in which a breaker-roll is journalled in said swinging frame and equipped in the spaces between said shoes with teeth adapted to engage the strips of batting; and means for periodically arresting the rotation of the breaker-roll and holding it to effect breaking of the strips of batting.

15. In a machine of the character specified: a frame; a vertically adjustable cross-head mounted on said frame; ridge-forming chains adapted to carry a fabric; means co-acting with said ridge-forming chains to produce fullness of the fabric between the chains; a forming-roll journaled on said cross-head provided with peripheral grooves through which the ridge-chains work; a series of creasing devices co-acting with said grooves to form ridges in another fabric fed between said devices and forming-roll; a series of seam-blades over which the seams ride on leaving the ridge-forming chains; and a series of sewing mechanisms mounted on said cross-head coacting with said seam-blades.

16. A machine as specified in claim 15, in which the cross-head is equipped with a series of grooved shoes into which the seam-blades extend.

17. In a machine of the character set forth: a main frame having mounted thereon a bed comprising a series of relatively long ridge-forming chains and a series of relatively short intervening pleat-carrying chains; a cross-head adjustably mounted on the main frame and disposed over the front portions of the ridge-forming chains and intermediate portions of the pleat-carrying chains; means carried by said cross-head and co-acting with the ridge-forming chains and permitting passage of seams therethrough, said means including means for forming seams in a lining-fabric, said ridge-forming chains serving to carry a finish-fabric; and a series of sewing mechanisms mounted on said cross-head and adapted to effect sewing of the seams.

18. A machine comprising: a bed comprising means for carrying a fabric and forming upstanding seams with intervening fullness of the fabric providing for pleats; a cross-head adjustably mounted and disposed above said bed; a grooved forming-roll journalled on said cross-head; a series of sewing mechanisms carried by and laterally adjustable with respect to said cross-head; means for delivering another fabric beneath said forming-roll and providing it with upstanding seams within which the first-mentioned seams are nested; and means for actuating said forming-roll.

19. A machine as specified in claim 18, in which the cross-head is equipped also with shoes co-acting with the grooves of the forming-roll and serving to form relatively shallow seams in a fabric fed between the shoes and the forming-roll.

20. A machine as specified in claim 18, in which the bed of the machine has mounted thereon a series of seam-blades co-acting with the front ends of the ridge-forming chains, said blades being laterally adjustable on said bed.

21. A machine of the character set forth, comprising: a bed comprising relatively long ridge-forming chains adapted to carry a finish-fabric and relatively short pleat-carrying chains extending some distance in front of the ridge-forming chains; a feed-roll co-acting with the front ends of the pleat-carrying chains; a vertically adjustable cross-head disposed over the front portions of the ridge-forming chains and equipped with laterally adjustable shoes provided with grooves; a forming-roll journalled on the cross-head and disposed in the rear thereof and having grooves corresponding with the grooves in said shoes; a series of sewing mechanisms mounted on the cross-head at the front side thereof and laterally adjustable with relation to the cross-head; a guide mounted on the bed back of the forming-roll over which strips of batting may be led; and a breaker-roll mounted on the cross-head and co-acting with said guide.

22. A machine as specified in claim 21, in which the guide over which strips of batting are led comprises a shoe equipped with grooves and in which the breaker-roll is equipped with teeth co-acting with said grooves.

23. In a machine of the character set forth: a forming-roll provided with peripheral grooves; a bed beneath said roll equipped with carrier-chains; and a series of shoes provided with grooves registering with the grooves of said roll, the shoes at the ends of the series being equipped with springs serving to press the lateral margins of the fabric against the underlying carrier-chains to maintain the fabric in proper position thereon.

24. In a machine of the character set forth: a vertically adjustable cross-head; a forming-roll journalled therein and provided with peripheral grooves; and a series of shoes adjustably connected with the lower portion of said cross-head and provided with grooves registering with the grooves of said forming-roll.

25. A machine of the character set forth, comprising: a bed equipped with means for carrying a finish-fabric; a cross-head adjustably mounted on said bed; means mounted on said cross-head and co-acting with said bed for feeding plies of fabric and intervening strips of batting between the bed and cross-head; a shaft journalled on the cross-head and having a section journalled in a stationary bearing at one side of the bed and jointed connection between said section and the section journalled on the cross-head; and a series of sewing mechanisms mounted on said cross-head and carrying sewing instrumentalities actuated by said shaft.

26. A machine of the character set forth, comprising: a main frame equipped with a vertically adjustable cross-head; a traveling bed mounted in the main frame and comprising a series of ridge-forming chains; a forming-roll journalled on said cross-head; a series of sewing mechanisms mounted on said cross-head in front of said forming-roll; a shaft journalled on the cross-head and serving to actuate said sewing mechanisms; means mounted on the main frame for actuating said shaft; and a series of creasing devices mounted on said cross-head and disposed in the rear of said forming-roll and co-acting with the grooves thereof.

27. A machine as specified in claim 26, in which the sewing mechanisms are mounted on the shaft journalled on the cross-head and equipped with sewing instrumentalities actuated by said shaft.

28. A machine as specified in claim 26, in which the sewing mechanisms are suspended on the actuating shaft carried by said cross-head and equipped with sewing instrumentalities actuated by said shaft and equipped also with means for effecting the swinging of the sewing mechanisms, said last-named means being actuated by said shaft.

29. A machine as specified in claim 26, in which the ridge-forming chains are mounted on laterally adjustable guides carried by the main frame.

30. A machine of the character specified in claim 26, in which the ridge-forming chains are mounted on laterally adjustable guides and in which laterally adjustable fabric-gathering and forming devices are mounted over the several ridge-forming chains.

31. In a machine of the character set forth: a main frame; a vertically movable cross-head mounted thereon; sewing mechanisms mounted on said cross-head; an actuating shaft for said sewing mechanisms carried by said cross-head; driving means for said shaft mounted on the main frame; a series of ridge-forming chains mounted on the main frame; driving means for said shaft and for said chains, comprising a main clutch; and means for controlling said main clutch comprising a front treadle and a rear treadle equipped with means whereby the clutch may be thrown out of engagement by actuating either treadle and whereby the clutch may be thrown into engagement only by means of the front treadle.

32. In a machine of the character set forth: a series of ridge-forming chains geared together; a breaker-roll actuated from the gearing of said chains; and mechanism controlling the actuating of the breaker-roll, including a clutch device and a brake device controlled by a cam actuated from the gearing mechanism of said chains.

33. In the manufacture of cushions, the steps which comprise: feeding plies of cloth continuously; sewing the plies together to form pleats; feeding batts to the pleats as they are formed; and periodically arresting and severing the batts, thus forming a series of cushions connected by fabric.

34. In the manufacture of cushions, the steps which comprise: feeding continuously a lining fabric and a series of pre-cut cover-fabrics; sewing said fabrics together and forming pleats; feeding batts to the pleats as they are formed; and periodically arresting the feed of the batts and severing them, thus forming a series of cushions connected by the lining-fabric.

35. In a machine of the character set forth: means for feeding a plurality of plies of fabric and intervening strips of batting and forming nested seams from the fabrics, said means comprising an adjustable cross-head, a forming-roll journalled in said cross-head and provided with peripheral grooves, and means mounted on said cross-head and co-acting with said grooves in the forming of U-shape seams in one of the fabrics.

36. In combination: means for feeding fabrics and intervening strips of batting and forming the fabrics into seams comprising nested seam-ridges; and a series of sewing mechanisms at one side of said fabrics, each sewing mechanism comprising a looper-needle moving in an elliptical path at one side of the corresponding seam, and a co-acting sewing-needle working through the seam from the opposite side.

37. In combination: means for feeding fabrics and intervening strips of batting and forming the fabrics into seams comprising nested seam-ridges; and a sewing mechanism corresponding with each seam comprising a head provided with seam-engaging means, a sewing-needle mounted at one side of said head and adapted to work through the seam, a looper-needle of thread-carrying type mounted at the other side of said head and moving in an elliptical path and co-acting with the sewing-needle, means mounted on said head for actuating said needles, means for supporting thread-supply sources for said needles, and thread-tensioning means between said needles and the supports for said thread-supply sources.

38. A method of forming upholstery comprising the steps: advancing cover and lining fabrics; feeding batting to occupy a position between said cover and lining fabrics; separating said batting into sections while it is being fed between said fabrics; and sewing said fabrics to each other.

39. A method of forming upholstery comprising the steps: advancing cover and lining fabrics; sewing said fabrics to each other while they are being advanced; and feeding sections of batting between said advancing fabrics in such manner that a plurality of longitudinally spaced sections are provided between each cover fabric and its lining fabric.

40. In a machine of the character set forth: a main frame having a bed equipped with means adapted to serve in the forming of upstanding seam-ridges and intervening pleat-fullnesses in a fabric fed thereover; a vertically adjustable cross-head above said bed; means for conducting a second fabric between said cross-head and bed; means for conducting batts between the fabrics and into the pleat-fullness; a series of sewing-mechanisms mounted on said cross-head and equipped with sewing-needles; actuating means mounted on said vertically adjustable cross-head serving to actuate said sewing-needles; and driving means mounted on said main frame and operatively connected with and serving to actuate the actuating means mounted on said cross-head in any desired position of adjustment of said cross-head.

41. A machine as specified in claim 40, in which the cross-head is provided with adjustably spaced shoes between which the seams may pass and beneath which the stuffed pleats may pass.

42. A machine as specified in claim 40, in which the vertically adjustable cross-head carries a positively driven device between which and the bed the fabrics and intervening batts pass, said device having spaced recesses through which the seams may pass, and in which driving means mounted on the main frame is connected with and serves to actuate said positively driven device in any desired position of adjustment of said cross-head.

43. In combination in a machine for making stuffed, pleated upholstery: means for feeding fabrics and sewing them together along lines which are spaced apart thus providing pleats; means for conducting batts between the fabrics and into the pleats as they are formed, whereby the portions of the batts in the pleats will be fed forward with the upholstery; feed-means normally operative to function as feeding means for the succeeding portions of the batts; and automatically acting means serving to intermittently arrest said last-mentioned feed means and effect severance of the batts.

44. A machine as specified in claim 40, in which the bed is equipped with means for feeding fabrics through the machine and drawing therewith the portions of the batts entered in the pleats, and in which the machine is also equipped with means which functions periodically to arrest the movement of the succeeding portions of the batts and effect severance of the batts.

45. Mechanism as specified in claim 40, in which the vertically adjustable cross-head carries a forming-roll provided with spaced circumferential grooves through which seams may pass and in which devices are provided which co-act with said grooves to form seam-ridges in the second fabric preparatory to receiving therein, in nested relation, the seam-ridges of the first fabric.

46. Sewing mechanism comprising a head equipped at opposite sides with slides; a seam-engaging shoe depending from said head; a transversely swinging sewing-needle lever mounted on said head and actuated by one of said slides; a looper-needle lever pivotally mounted on the other slide and swinging in a plane parallel with the seam; and mechanism mounted on said head serving to actuate said slides and effect swinging of said last-mentioned lever.

47. In a machine of the character set forth: means for feeding a plurality of plies of fabric and forming therefrom outstanding seams, one extending within the other; a movable head; a sewing-needle actuating arm mounted on said head and equipped with a sewing needle adapted to work through the seam; a looper-needle actuating arm mounted on said head and equipped with a looper needle of thread-carrying type adapted to work in a plane substantially parallel with the seam; means mounted on said head serving to actuate said arms; and a device co-acting with said head and adapted to advance and retract the head.

48. Sewing mechanism comprising: a swinging head; a sewing-needle actuating arm pivoted on said head to swing in a transverse plane; a looper-needle actuating arm adapted to swing in a plane parallel with a lateral side of said head and to be raised and lowered; and mechanism mounted on said head adapted to oscillate said first-mentioned arm and to raise and lower and effect swinging of said second-mentioned arm.

49. In sewing mechanism: a swinging head equipped at its lateral sides with slides, a sewing-needle actuating arms pivoted on said head and actuated by one of said slides, a looper-needle actuating arm pivotally connected with the other slide; and a shaft journalled in said head and equipped with crank-pins linked to said slides and equipped also with an eccentric adapted to oscillate said looper-needle actuating arm.

50. In sewing mechanism: a pivotally suspended head equipped at its operative end with a seam-embracing member; a sewing-needle actuating arm pivoted on said head and adapted to carry a needle through a seam embraced by the seam-embracing member; a looper-needle actuating arm adapted to rise and fall and swing in a plane parallel with the seam; mechanism mounted on said head for actuating said arms; and means for advancing and retracting said head.

51. In sewing mechanism: a pivotally suspended head equipped at its outward end with a seam-embracing member having a slot through which a seam may pass; a stationary fin extending into said slot over which the seam may ride; a sewing-needle actuating arm pivoted on said head and equipped with a sewing needle adapted to work through said seam-embracing member; a looper-needle actuating arm supported on said head and capable of rising and falling and also swinging; and mechanism mounted on said head serving to actuate said needles.

52. In sewing mechanism of the character described, a head equipped at one end with a seam-embracing member, slides connected with the lateral sides of said head, a sewing-needle actuating arm pivoted in said head and extending through one of said slides and actuated thereby, a looper-needle actuating arm pivotally connected with the other slide, and means mounted on said head for actuating said slides and for oscillating said looper-needle actuating arm.

53. In combination: means for continuously feeding fabrics and forming a seam comprising nested seam-ridges; and sewing-mechanism comprising a looper-needle moving in an elliptical path at one side of said seam, and a co-acting sewing-needle working through the seam from the opposite side.

54. In combination: fabric-feeding and seam-forming means; and sewing-mechanism comprising a head equipped with a lever working in a transverse plane and with a lever working in a plane parallel with the seam, means mounted on said head for oscillating said first-mentioned lever and for oscillating and raising and lowering said second-mentioned lever, a sewing-needle carried by said first-mentioned lever, and a looper-needle of thread-carrying type carried by said second-mentioned lever.

55. In combination: fabric-feeding and seam-forming means; a transverse beam equipped with a bracket provided with a bearing; a shaft journalled in said bearing; and a sewing mechanism comprising a head pivotally suspended from said bracket; levers mounted at opposite sides of said head; actuating means for said levers actuated by said shaft; a sewing-needle carried by one of said levers; and a looper-needle carried by the other of said levers.

56. In sewing mechanism: a support having bearings; a main actuating shaft journalled in said bearings; a head pivotally mounted on said bearings; a second shaft parallel with said first shaft and journalled in said head and geared to said first shaft; and sewing instrumentalities mounted on said head and actuated by said second shaft.

57. Sewing mechanism as specified in claim 56, in combination with a spring yieldingly holding said head in normal position.

58. In combination: a frame-member equipped at its lower portion with spaced shoes between which a seam may pass; means for feeding fabrics beneath said frame-member and forming an upstanding seam comprising nested seam-ridges; and sewing mechanism comprising a bracket mounted on said frame-member and adjustable transversely with respect to the direction of feed of the fabrics, a sewing head pivotally suspended on said bracket, an actuating shaft extending through said bracket at the axis of said head, a seam-engaging shoe at the lower end of said head, a sewing-needle mounted on said head, and a device mounted on said head and actuated by said shaft and serving to actuate said needle.

FRANK W. BRINTNALL.
FREDERICK N. ROSS.